US010836419B2

(12) United States Patent
Oakes

(10) Patent No.: US 10,836,419 B2
(45) Date of Patent: Nov. 17, 2020

(54) STROLLER

(71) Applicant: Stroller Tech Limited, Hong Kong (HK)

(72) Inventor: Michael John Oakes, Ipswich (GB)

(73) Assignee: Stroller Tech Limited, Hong Kong (HK)

( * ) Notice: Subject to any disclaimer, the term of this patent is extended or adjusted under 35 U.S.C. 154(b) by 0 days.

(21) Appl. No.: 16/333,393

(22) PCT Filed: Aug. 25, 2017

(86) PCT No.: PCT/IB2017/055128
§ 371 (c)(1),
(2) Date: Mar. 14, 2019

(87) PCT Pub. No.: WO2018/051202
PCT Pub. Date: Mar. 22, 2018

(65) Prior Publication Data
US 2019/0256120 A1   Aug. 22, 2019

(30) Foreign Application Priority Data

Sep. 14, 2016   (GB) .................................. 1615653.1

(51) Int. Cl.
*B62B 7/08*   (2006.01)
*B62B 7/14*   (2006.01)
(Continued)

(52) U.S. Cl.
CPC ................ *B62B 7/08* (2013.01); *B62B 7/062* (2013.01); *B62B 7/142* (2013.01); *B62B 7/145* (2013.01);
(Continued)

(58) Field of Classification Search
CPC ........... B62B 7/06; B62B 7/062; B62B 7/142; B62B 7/145; B62B 7/147; B62B 9/00; B62B 9/102; B62B 9/104
See application file for complete search history.

(56) References Cited

U.S. PATENT DOCUMENTS 9,050,993 B2    6/2015  Pollack
2010/0025968 A1*  2/2010  Fritz ....................... B62B 7/062
                                                           280/647
(Continued)

FOREIGN PATENT DOCUMENTS

CN   201520324 U   7/2010
CN   102975757 A   3/2013
(Continued)

OTHER PUBLICATIONS

International Search Report dated Nov. 22, 2017, in connection with PCT/IB2017/055128.
(Continued)

*Primary Examiner* — Erez Gurari
(74) *Attorney, Agent, or Firm* — Downs Rachlin Martin PLLC

(57) ABSTRACT

Disclosed is a stroller (1) moveable between a fully deployed state and a fully collapsed state. The stroller (1) comprises: a seat (2) comprising a seat back (5) pivotably connected to a seat base (6), and one or more stops arranged to prevent the stroller (1) from moving from its fully deployed state to its fully collapsed state, wherein the one or more stops arranged to be released to permit the stroller (1) to move from its fully deployed state to its fully collapsed state when at least one of the seat base (6) and seat back (5) is pivoted towards the other. The stroller provides improved safety.

22 Claims, 37 Drawing Sheets

(51) Int. Cl.
  *B62B 9/00* (2006.01)
  *B62B 9/10* (2006.01)
  *B62B 7/06* (2006.01)
(52) U.S. Cl.
  CPC ............... *B62B 7/147* (2013.01); *B62B 9/00* (2013.01); *B62B 9/102* (2013.01); *B62B 9/104* (2013.01); *B62B 2205/22* (2013.01); *B62B 2205/24* (2013.01)

(56) References Cited

U.S. PATENT DOCUMENTS

| | | | | |
|---|---|---|---|---|
| 2010/0314855 A1* | 12/2010 | Mival | ........................ | B62B 7/08 280/650 |
| 2011/0291389 A1* | 12/2011 | Offord | ..................... | B62B 7/08 280/650 |
| 2012/0032419 A1* | 2/2012 | Li | ............................ | B62B 7/08 280/647 |
| 2014/0008946 A1* | 1/2014 | Smith | ....................... | B62B 7/08 297/183.1 |
| 2014/0028002 A1* | 1/2014 | Li | ............................ | B62B 9/00 280/647 |
| 2014/0361518 A1* | 12/2014 | Tomasi | ..................... | B62B 7/06 280/650 |
| 2015/0291200 A1* | 10/2015 | Taylor | ..................... | B62B 3/022 280/642 |
| 2017/0057533 A1* | 3/2017 | Ransil | ....................... | B62B 7/08 |
| 2017/0313339 A1* | 11/2017 | Ruggiero | ................ | B62B 9/245 |
| 2019/0256120 A1* | 8/2019 | Oakes | .................... | B62B 7/147 |

FOREIGN PATENT DOCUMENTS

| | | |
|---|---|---|
| CN | 103359146 A | 10/2013 |
| CN | 203693078 U | 7/2014 |
| FR | 2666294 A1 | 3/1992 |

OTHER PUBLICATIONS

Written Opinion dated Nov. 22, 2017, in connection with PCT/IB2017/055128.
International Preliminary Report on Patentability dated Mar. 19, 2019, in connection with PCT/IB2017/055128.

* cited by examiner

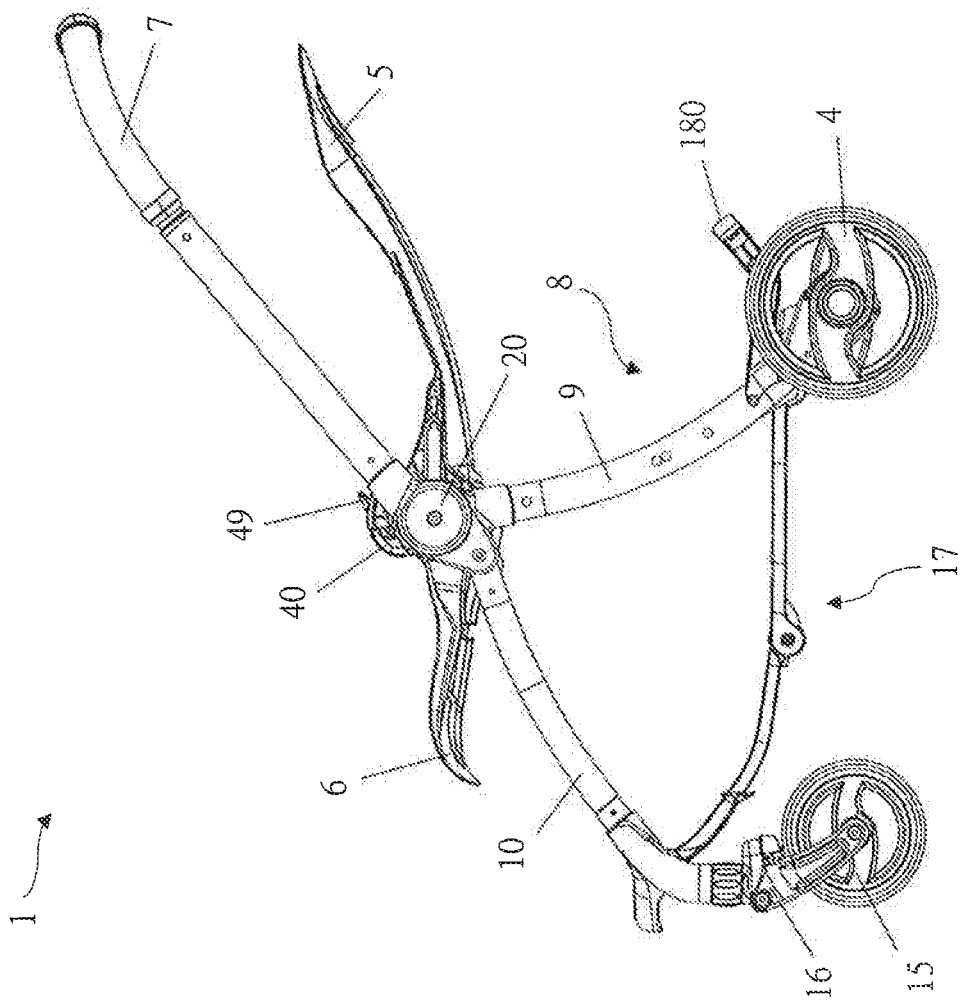

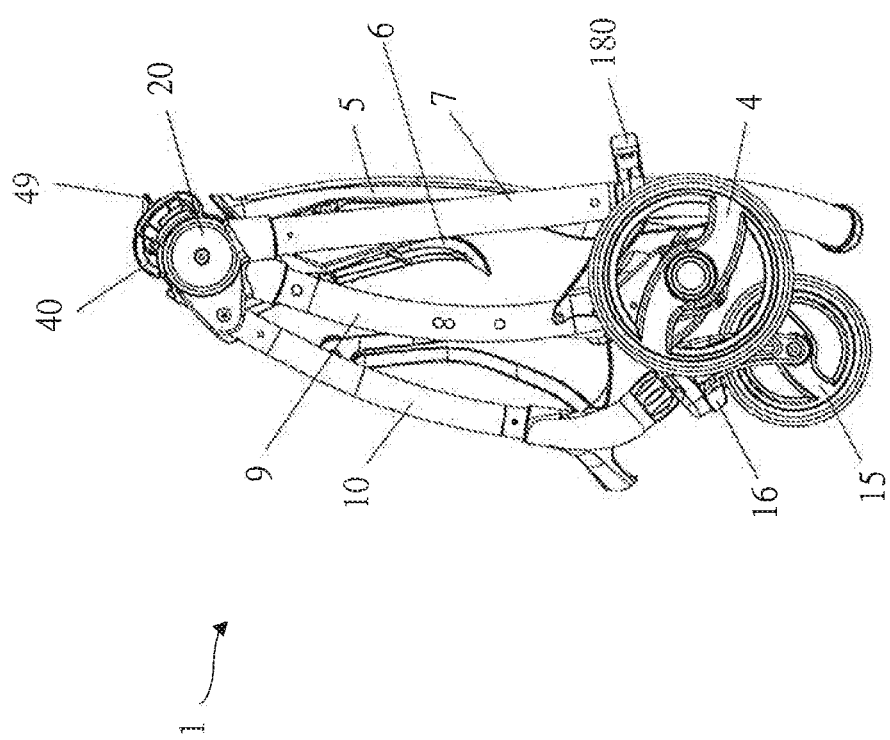

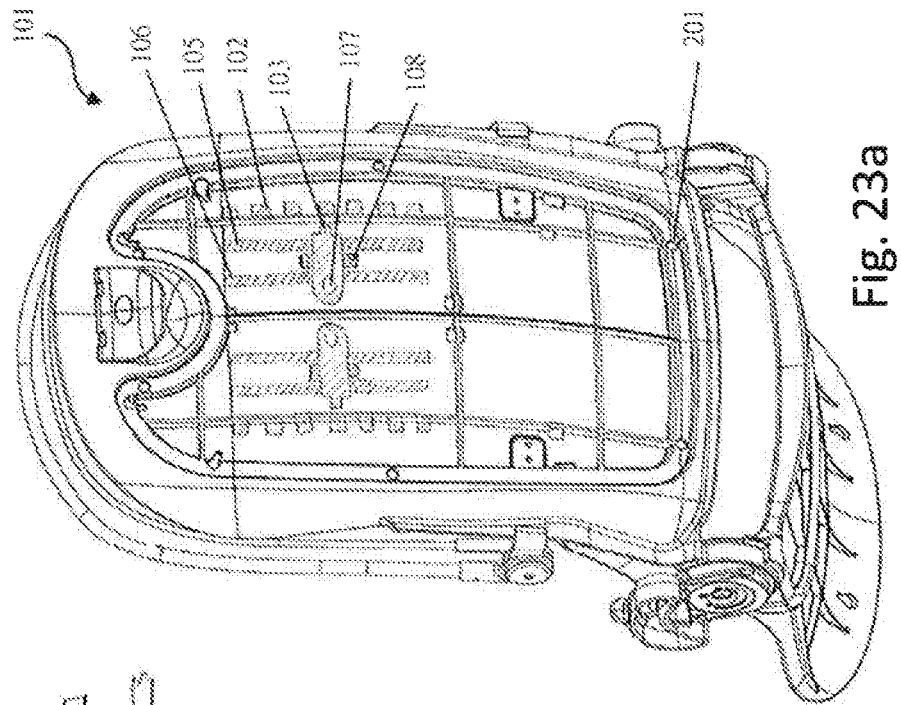
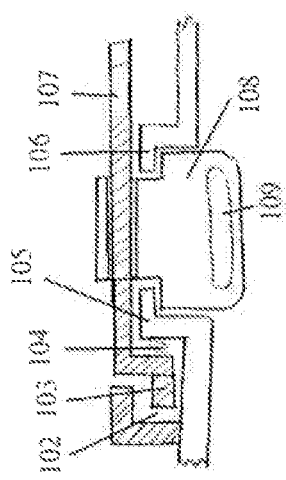
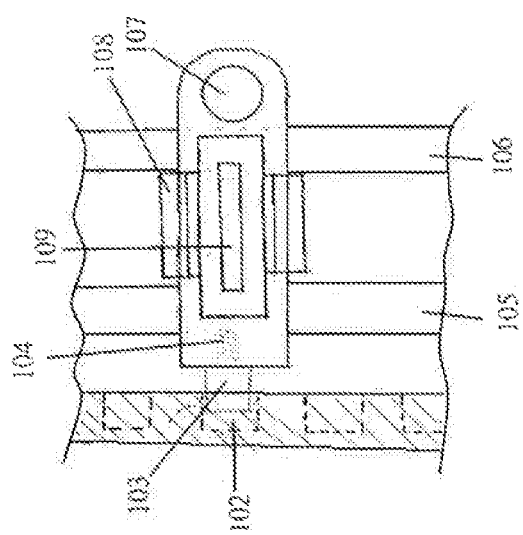

STROLLER

TECHNICAL FIELD OF THE INVENTION

The present invention relates to a stroller (or buggy or pushchair) comprising a folding frame, in particular to a stroller providing improved safety.

BACKGROUND TO THE INVENTION

Strollers (also known as buggies or pushchairs) are devices that are used to transport children. Strollers typically comprise a child seat mounted to a frame that is supported on three or more wheels. Some strollers are designed so that the seat can be oriented forward facing or rear facing (backward facing) so that the child can face either away from the parent or towards the parent. The frame of a stroller typically comprises a number of joints that allow it to fold or collapse so that the stroller can be stored or transported more easily.

There is however a safety concern that a conventional stroller may accidentally or unintentionally fold or collapse with a child still sitting in the seat of the stroller, which could result in serious injury to the child.

In addition, typically, the seat must be either removed from the stroller or positioned in a particular orientation relative to the frame before the frame can be collapsed.

Embodiments of the present invention seek to address the above problems.

SUMMARY OF THE INVENTION

According to a first aspect of the present invention, there is provided a stroller moveable between a fully deployed state and a fully collapsed state, the stroller comprising: a seat comprising a seat back pivotably connected to a seat base; and one or more stops arranged to prevent the stroller from moving from its fully deployed state to its fully collapsed state, wherein the one or more stops are arranged to be released to permit the stroller to move from its fully deployed state to its fully collapsed state when at least one of the seat base and seat back is pivoted towards the other.

In this way, the stroller may only be folded from its fully deployed state into its fully collapsed state if at least one of the seat back and the seat base has been pivoted so that they come together. With the first aspect of the invention, there is a reduced likelihood that the stroller can be accidentally or unintentionally folded into its fully collapsed state with a child still sat in the seat because the size and weight of the child's body physically prevents at least one of the seat base and the seat back from pivoting towards the other to permit the one or more stops to release and allow the stroller to be move to its fully collapsed state. Accordingly, the first aspect of the invention provides a stroller having improved safety.

In addition, the arrangement of the first aspect of the invention allows for the stroller to be moved between its fully deployed state and its fully collapsed state without having to either remove the seat from the stroller or position the seat in a particular orientation relative to the stroller.

The stroller may further comprise a frame. The seat may be releasably mountable to the frame. The seat may be pivotably mountable to the frame. The frame may comprise one or more front legs connected to one or more rear legs. In particular, the frame may comprise two front legs connected to two rear legs. The one or more front legs may be pivotably connected to the one or more rear legs. The one or more front legs and/or the one or more rear legs may be moveable between a deployed state, in which the one or more front legs are spaced apart from the one or more rear legs, and a folded state, in which the one or more front legs are adjacent the one or more rear legs. Each of the one or more front legs may be connected to a wheel. Each of the one or more rear legs may be connected to a wheel.

The frame may comprise a handle. The handle may be pivotably connected to the frame, for example to the one or more front legs and/or the one or more rear legs. The handle may be moveable between a deployed state, in which the handle is spaced away from the one or more front legs and the one or more rear legs, and a folded state, in which the handle is adjacent the one or more front legs and/or the one or more rear legs.

The seat back and/or seat base may each be substantially rigid. The stroller may be arranged so that the seat is mountable to the stroller in a forward facing orientation or a rear facing orientation. The seat may be pivotably mountable to the stroller. The seat may be moveable between a deployed state, in which it can be sat on by a child, a folded state, in which the seat back and the seat base are adjacent and/or substantially parallel to one another, and a stowed position, in which the seat is in its folded state and is adjacent and/or substantially parallel to the one or more front legs, the one or more rear legs and/or the handle.

When the stroller is in its fully collapsed state the one or more front legs, one or more rear legs and the handle and are in their folded states and the seat is in its stowed state. In this way, when the stroller is in its fully collapsed state, it is difficult or impossible for a user to sit in the seat.

When the stroller is in its fully deployed state, the one or more front legs, the one or more rear legs, the handle and the seat are in their deployed states. In this way, when the stroller is in its fully deployed state a child can sit in the seat.

The stroller may further comprise one or more handle adjustment mechanisms for enabling the handle to move between its deployed state and its folded state so that the stroller can move between its fully deployed state and its fully collapsed state. The stroller may comprise two handle adjustment mechanisms. Each handle adjustment mechanism may be connected to an end of the handle.

The or each handle adjustment mechanism may comprise a releasable lock operable to permit or prevent movement, for example pivoting, of the handle between its deployed and folded states. One or more user operable controls may be provided to enable a user to operate the or each handle adjustment mechanism.

The user operable control may comprise a twist grip mechanism which may be operable by rotating a twist grip portion attached to the handle.

The or each handle adjustment mechanism may be arranged so that the handle may only be moved between its deployed state and its folded state when the seat is in a stowed position.

In one embodiment the user operable control is arranged to urge a locking element, such as a cog, out of locking engagement with other features of the handle adjustment mechanism when operated by a user. The locking element may comprise a protrusion. The protrusion may be arranged to face away from the handle adjustment mechanism. The protrusion may be arcuate. The protrusion may be shaped to correspond with and/or engage with an opening or aperture in another part of the stroller. Preferably, the handle adjustment mechanism is arranged so that the protrusion must extend into or engage with an opening or aperture in another part of the stroller to permit the handle to move between its deployed state and its folded state.

The stroller may further comprise one or more seat mounting mechanisms for releasably attaching the seat to the stroller. The stroller may preferably comprise two seat mounting mechanisms. Each seat mounting mechanism may be mounted on the frame. Each seat mounting mechanism may be arranged to releasably attach to a corresponding mechanism on the seat. Each seat mounting mechanism may comprise an opening for receiving a protrusion on the locking element of the or each handle adjustment mechanism. The opening may be arcuate.

Each seat mounting mechanism may comprise a forward facing stop arranged to prevent rotation of the seat base downwards when the seat is in a forward facing orientation and in its deployed state. The forward facing stop may be fixed in position. Each seat mounting mechanism may comprise a rear facing stop arranged to prevent rotation of the seat base downwards when the seat is in a rear facing orientation and in its deployed state. The rear facing stop may be moveable between operative and inoperative positions and may be slidably mounted to the forward facing stop and/or seat mounting mechanism. The rear facing stop may be moveable towards and away from its seat mounting mechanism. The rear facing stop may comprise a biasing means operative to bias the stop towards its operative position. The biasing means may be a spring. In this way, each seat mounting mechanism may comprise two stops, each for preventing the seat base from moving beyond its intended position in use, in both front and rear facing orientations.

The seat may further comprise one or more seat hubs for pivotably connecting the seat back and the seat base together. The seat may preferably comprise two seat hubs. A seat hub may be mounted to each opposite side of the seat. Each seat hub may comprise a switch and a seat locking member. The switch may be operable to engage and disengage the seat locking member with a part of the seat mounting mechanism in order to secure the seat to, or release it from, the frame of the stroller.

Each seat hub may comprise a plate disposed at its centre. The plate may be formed from a metal. The plate may comprise an aperture. The aperture may be curved. The aperture may be shaped to correspond to the protrusion formed on the locking element of the handle adjustment mechanism. The plate may be arranged to permit or prevent movement of the protrusion on the locking element and thus operation of the handle adjustment mechanism depending on the relative orientations of the seat hub and the handle adjustment mechanism. In this way, if the aperture is aligned with the protrusion then the aperture and the protrusion are permitted engage with one another, which permits the handle to move between its deployed state and its folded state. However, if the aperture is not aligned with the protrusion then the aperture and the protrusion are prevented from engaging with one another, which prevents the handle being rotated relative to the frame and thus being moved between its deployed state and its folded state.

Each seat hub may comprise a reclining mechanism that allows the seat back to recline relative to the stroller and/or the seat base. The reclining mechanism may comprise a releasable locking member. The locking member may comprise a first locking element engageable with one or more teeth formed in the seat hub. The one or more teeth may correspond to different seat back recline positions, for example first, second and third recline positions. A user operable control may be provided to enable the locking member to be released to a first release position. In the first release position the locking member is released sufficiently to clear the recline teeth enabling the seat back to be moved between fully forward and fully reclined positions. A stop may be provided to prevent the seat back being reclined beyond the fully reclined position when the locking member is in the first release position.

The reclining mechanism may comprise a second locking element coupled to the first locking element. The first and second locking elements may be arranged so that they are parallel to one another. The second locking element may extend beyond the first locking element. The second locking element may extend beyond the first locking element radially towards the centre of the seat hub.

The seat base may further comprise a cam profile for engaging with the second locking element of the seat hub. The cam profile may define a ramp and a groove. The cam profile may be arranged to rotate about the seat hub as the seat base is moved. The cam profile may be arranged to contact with and raise the second locking element as the seat base is lifted such that the coupled first locking element is moved to a second release position, beyond the first. In the second release position the first locking element may be raised clear from, and beyond, the recline stop permitting the seat back to be moved back beyond its fully reclined position and so, when the seat is forward facing, into its stowed position.

The seat base may further comprise a seat base protrusion. The seat base protrusion may be arranged to rotate about the seat hub as the seat base is moved. The seat base protrusion may comprise a substantially flat abutment surface for abutting against the rear facing stop to support the seat base when the seat is in its rear facing orientation.

The seat back may further comprise a seat back protrusion. The seat back protrusion may be arranged to rotate about the seat hub as the seat back is moved. The seat back protrusion may comprise an angled surface engageable with the rear facing stop as the seat is moved from its deployed state to its folded state. This engagement between the seat back protrusion and the rear facing stop may move the rear facing stop from an engaged position to a disengaged position which permits the seat base protrusion to proceed beyond the rear facing stop and therefore allows the seat base to be rotated into the stowed position.

According to a second aspect of the present invention, there is provided a stroller comprising: a seat moveable between a deployed state and a folded state; a handle moveable between a deployed state and a folded state; and a handle adjustment mechanism, wherein the handle adjustment mechanism is arranged to permit the handle to move between its deployed state and its folded state only when the seat is in a predetermined state.

In this way, the handle of the stroller may only be folded from its deployed state to its folded state if the seat is in a predetermined state. This prevents accidental folding of the handle which reduces the likelihood that the handle will be moved to its folded state whilst a child is still in the seat. Accordingly, the second aspect of the invention provides a stroller having improved safety.

The predetermined state may be when the seat is in its folded state. The predetermined state may be when the seat is in a stowed position.

The second aspect of the invention may comprise any feature of the first aspect of the invention.

DETAILED DESCRIPTION OF THE INVENTION

In order that the invention may be more clearly understood embodiments thereof will now be described, by way of example only, with reference to the accompanying drawings, of which:

FIG. 20c is a side view of the stroller of FIG. 20a with the seat in a third (full) recline position;

FIG. 22g is a side view of the stroller shown in FIGS. 22a to 22f in a fully collapsed state;

FIG. 23a is a rear perspective view of the seat of FIG. 1 with a rear cover removed and showing detail of an adjustable harness mount mechanism for the vertical position of a harness attached to the seat back (with the other components of the stroller removed for clarity);

FIG. 23b is a sectional top view of the adjustable harness mount of FIG. 23a;

FIG. 23c is an enlarged plan view of one of the side portions of the adjustable harness of FIGS. 23a and 23b;

Figure 1:
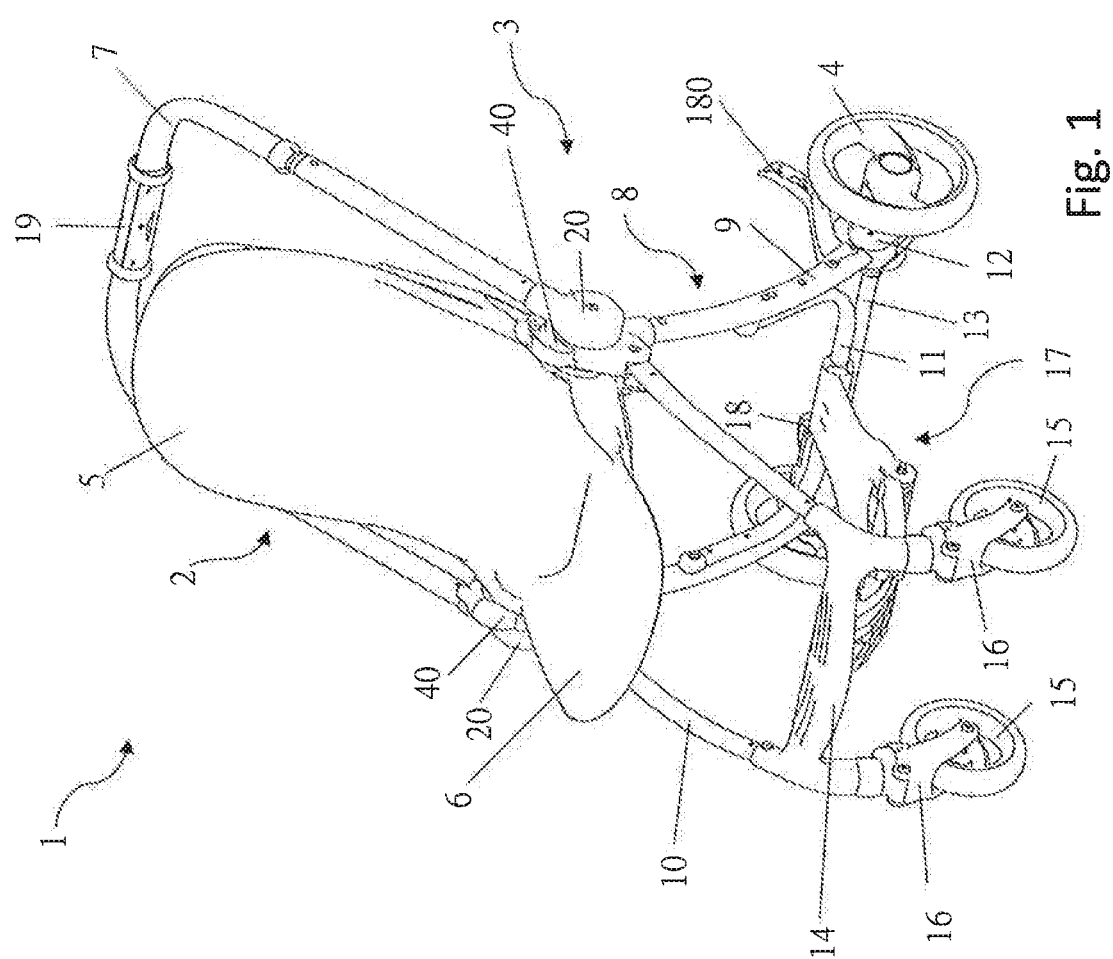
FIG. 1 is a perspective view of a stroller according to an embodiment of the invention in a fully deployed state with the seat in a forward facing orientation.
Figure 2:
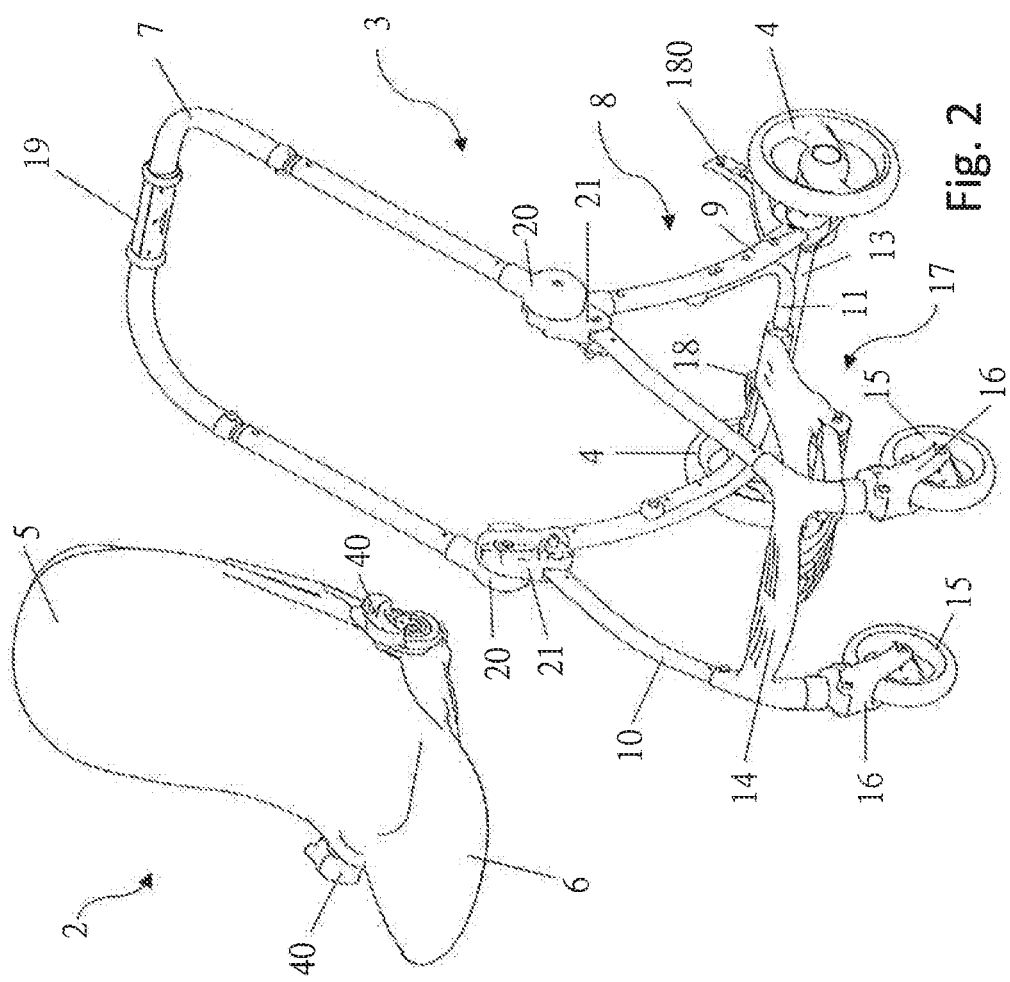
FIG. 2 is a corresponding view to FIG. 1, in which the seat has been detached from the frame for enabling a change in orientation from a forward facing orientation to a rear facing orientation.
Figure 4:
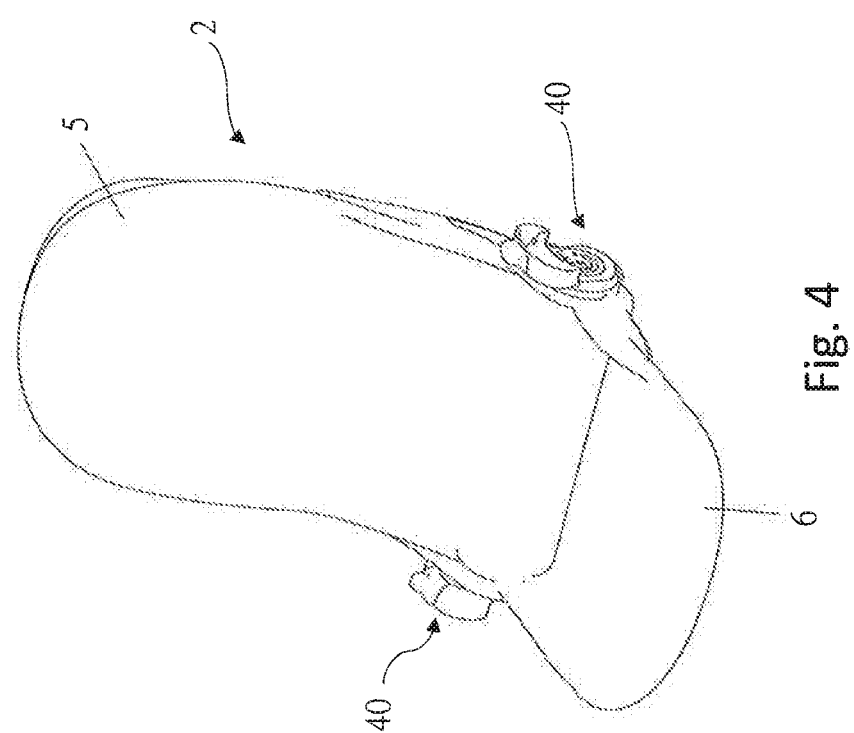
FIG. 4 is a perspective view of the seat shown in FIG. 1.

Referring particularly to FIGS. 1, 2 and 4, a stroller 1 comprises a detachable seat 2 mounted in a forward facing orientation to a frame 3 that is supported by two rear wheels 4 and two front wheels 15.

The seat 2 comprises a seat back 5 pivotably mounted to a seat base 6 in a manner such that that the seat back 5 and the seat base 6 are pivotable towards one another. The seat 2 comprises a pair of seat mounting mechanisms 21 that allow attachment and detachment of the seat 2 to and from the frame 3.

The seat 2 is shown in its deployed state in FIGS. 1 and 2 in which a child can sit in the seat 2. The folded state of the seat 2 is shown in e.g. FIGS. 20d and 22d, where the seat back 5 is adjacent and substantially parallel to the seat base 6. In this position, a child cannot sit in the seat 2. The stowed position of the seat (when in its folded state) is shown in e.g. FIGS. 20e and 22e. With the seat in the stowed position the stroller can be collapsed into a fully collapsed state for storage.

The frame 3 comprises a substantially U-shaped handle 7 pivotably mounted to a base 8 at the free ends of the "U". The handle 7 comprises a twist grip portion 19 rotatable relative to the handle 7. Rotation of the twist grip portion 19 operates a pair of handle adjustment mechanisms 20 that allow movement of the handle 7 from a deployed state (shown in FIGS. 1 and 2) to a folded state (shown in e.g. FIG. 21). The function of the twist grip portion 19 is described further below.

The base 8 comprises a pair of rear legs 9 pivotably connected to a pair of front legs 10.

The rear legs 9 are connected together by a fixed substantially U-shaped rear cross member 11. Each rear leg 9 is attached to an axle mount 12. A rear axle 13 extends through a bore in each of the axle mounts 12 and the rear wheels 4 are attached at opposing ends of the rear axle 13. A brake 18 is provided to lock one of the rear wheels 4 to prevent rotation, which prevents rotation of the rear axle 13 and thus movement of the stroller 1.

The front legs 10 are connected together by a fixed front cross member 14. Each front wheel 15 is attached to a front leg 10 by a fork 16 which is rotatably mounted to the front leg so that the wheel acts as a swiveling caster wheel.

The rear cross member 11 and the front cross member 14 are connected to one another by a pivotable connection to a lower basket support 17. The lower basket support 17 acts as a base for a basket for storage purposes and comprises a first portion and a second portion pivotably connected to one another.

Figure 3:
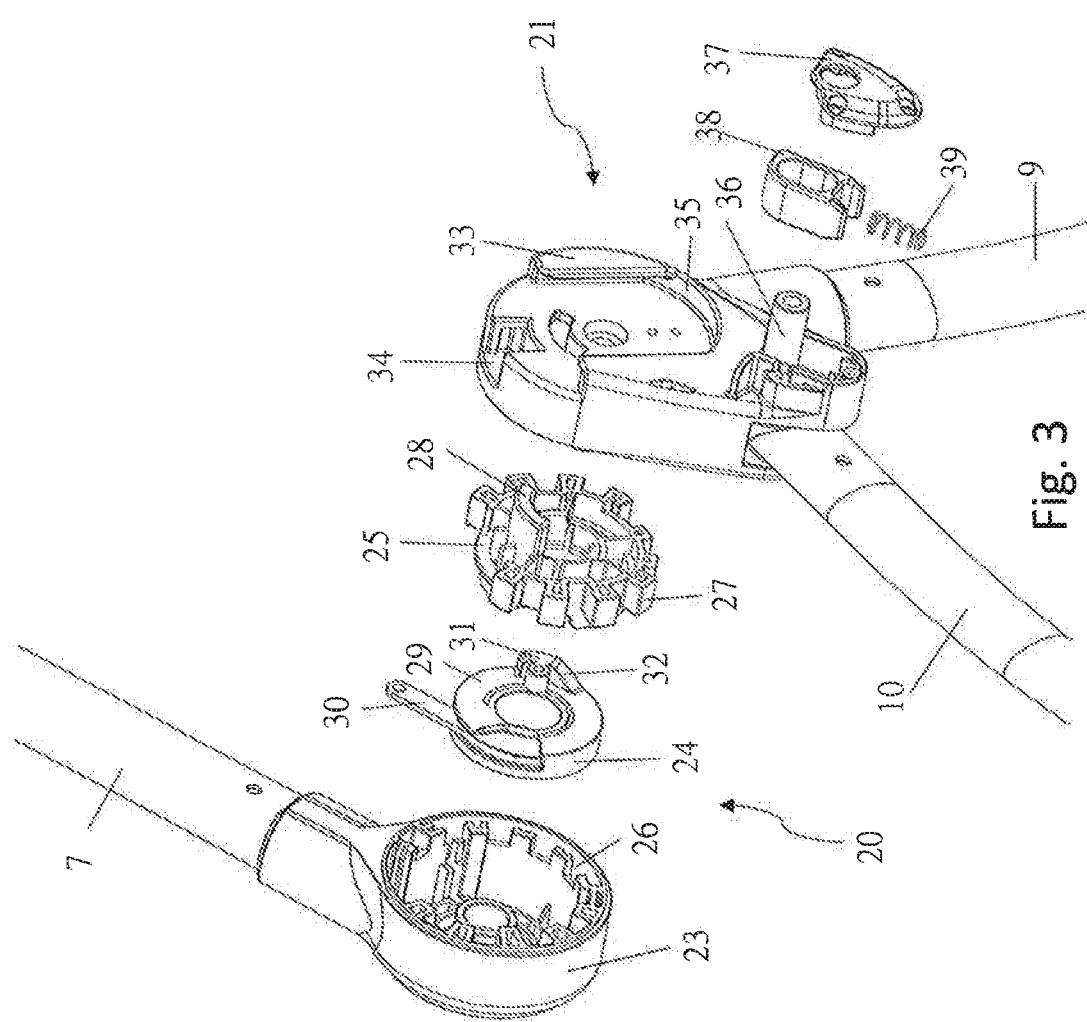
FIG. 3 is an exploded perspective view of the handle adjustment mechanism and its interaction with the seat mounting mechanism.

Referring to FIG. 3, each handle adjustment mechanism 20 comprises a handle adjustment housing 23 connected to the handle 7. The inside periphery of the housing comprises castellations 26 and houses a cog 25 inboard of a twist grip mechanism 24. The inside periphery of the seat mounting mechanism 21 housing also comprises a plurality of castellations (not visible) which may be aligned with the castellations 26 of the handle adjustment housing 23.

The cog 25 comprises a plurality of teeth 27 that engage with the castellations 26 in the housing 23 and the seat mounting mechanism housing so as to restrict rotational movement of the cog 25 relative to the housing 23 when the teeth engage with both sets of castellations. The cog 25 is also formed with an arcuate protrusion 28 that faces away from the housing 23 when the cog 25 is engaged with the housing 23.

The twist grip mechanism 24 comprises a disc 29 attached to an arm 30 that is connectable to a cable attached to the twist grip portion 19. Turning the twist grip portion 19 causes the disc 29 to rotate due to the action of the cable. A tooth 31 is formed on a surface of the disc 30 facing the cog 25. The tooth 31 is formed with an angled surface 32 for engaging with a corresponding angled surface on the cog 25. The angled surface 32 is arranged so that engagement of the tooth 31 with the cog 25 upon turning of the disc 29 urges the cog 25 axially away from the housing 23 so that the teeth 27 are clear of the castellations 26 of the housing 23. Axial movement of the cog 25 causes corresponding axial movement of the arcuate protrusion 28.

Each seat mounting mechanism 21 comprises a mounting 33 formed with a recess 34 comprising a part for locking with a part of the seat hub 40 formed on the seat 2. A pair of substantially parallel, spaced apart slots 35 is formed within the mounting 33 for releasably engaging with a corresponding protrusion formed on the seat hub 40. An arcuate opening 28a is formed within the seat mounting mechanism 21 between the pair of slots 35. The size and shape of the opening 28a corresponds to the size and shape of the protrusion 28 formed on the cog 25.

The handle adjustment mechanism 20 and the seat mounting mechanism 21 are assembled by mounting an axle, or other suitable fastener, through their respective apertures. In this position, the arcuate protrusion 28 sits within, and is aligned with, the arcuate opening 28a, preventing rotation of the cog 25 relative to the mounting 33.

In order to collapse the handle 7 from its deployed state to its folded state the twist grip portion 19 is rotated, which rotates the disc 29 and engages the tooth 31 with the cog 28, which urges the cog 28 towards the seating mounting mechanism and clear of the castellations 26 of the housing 23, and thus forces the curved protrusion 28 through the curved opening 28a. If the path for the curved protrusion 28 through the curved opening 36 is not clear then the curved protrusion 28 cannot be pushed through the curved opening 36, which means that it is not possible for the cog 25 to be pushed clear of the housing 23 to allow it to disengage from the handle 7 to permit the handle 7 to be rotated relative to the frame and thus moved between its deployed and stowed states.

The seat mounting mechanism 21 further comprises a fixed forward facing stop 36 and a moveable rear facing stop 38.

The forward facing stop 36 is fixed to the seat mounting mechanism 33 and is positioned so that it abuts with the seat base 6 when the seat 2 is mounted to the frame 3 in its forward facing orientation and in a deployed state. The forward facing stop 36 supports the seat base 6 in a position where it extends generally parallel to the surface on which the stroller rests, and prevents over rotation of the seat base 6 towards the surface, which would cause a child to fall off of the seat 2.

The rear facing stop 38 is slidably mounted to the seat mounting mechanism by way of a stop cover 37 having an aperture for engaging with the forward facing stop 36. The forward facing stop 36 extends through an elongate slot in the rear facing stop 38, permitting the rear facing stop to move between engaged and disengaged positions. A biasing means in the form of a spring 39 is provided for biasing the rear facing stop housing 38 into the engaged position, in which it abuts with the seat base 6 when the seat 2 is mounted to the frame 3 in its rear facing orientation and deployed state. The rear facing stop 38 supports the seat base 6 in a position where it extends generally parallel to the surface on which the stroller rests, and prevents over rotation of the seat base 6 towards the surface and its stowed position, which would cause a child to fall off of the seat 2.

Figure 5:
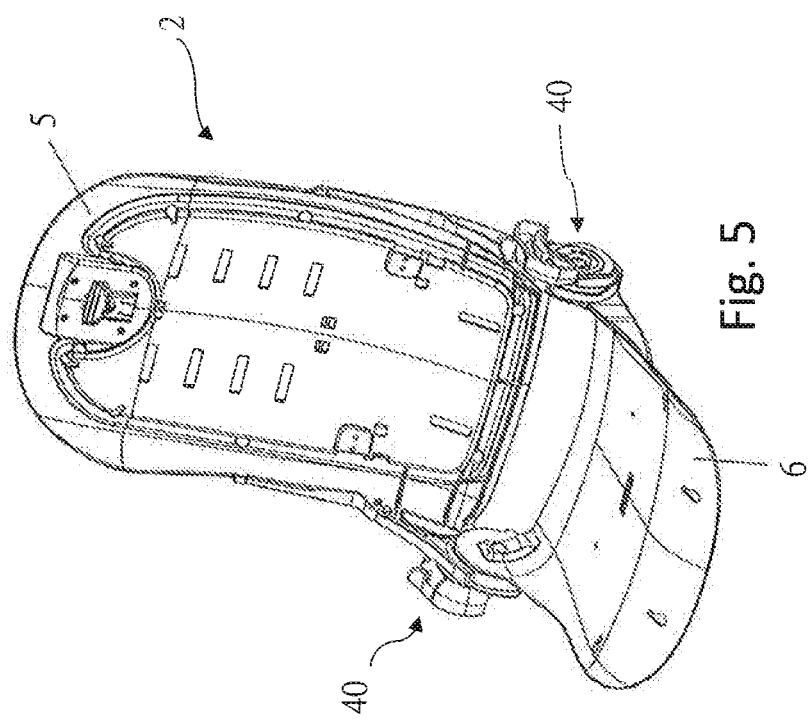
FIG. 5 is a perspective view of the seat of FIG. 4 with its padding removed.
Figure 6:
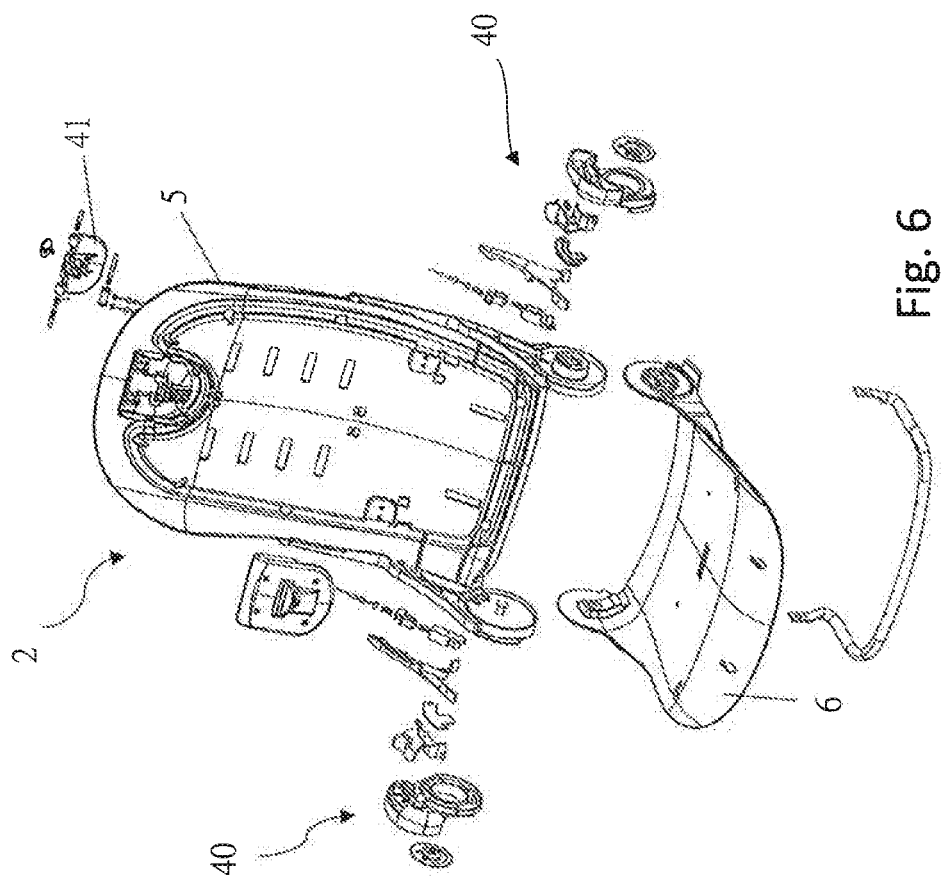
FIG. 6 is an exploded perspective view of the seat shown in FIG. 4.
Figure 7:
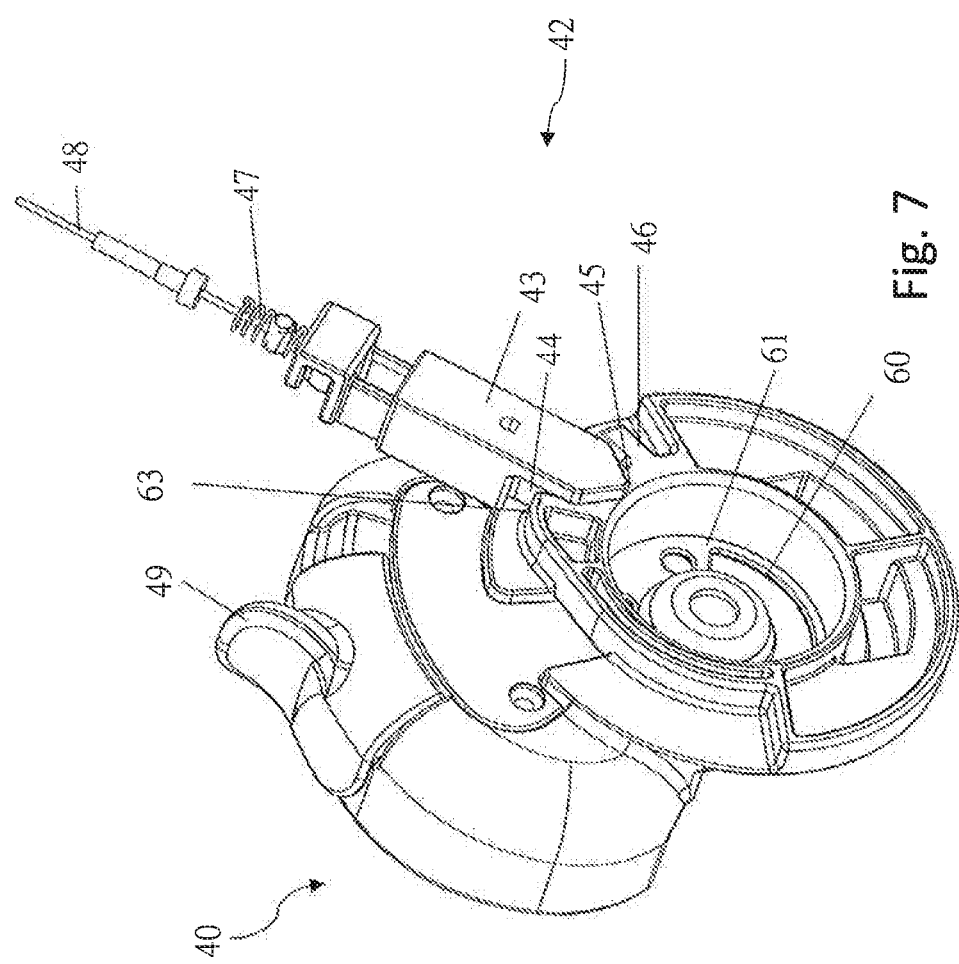
FIG. 7 is a schematic perspective view of a seat hub, with the locking member in a locked position.
Figure 8:
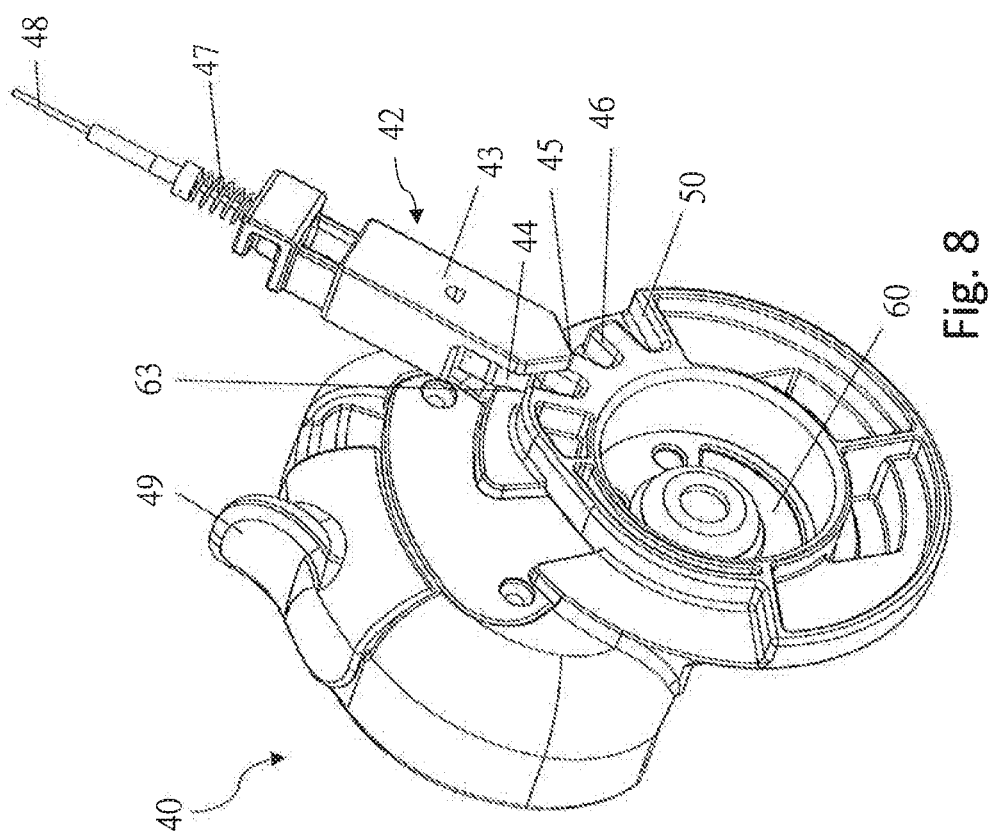
FIG. 8 is a corresponding view to FIG. 7, with the locking member in an unlocked position such that the seat back can be reclined.

Referring particularly to FIGS. 4, 5 and 6, a respective seat hub 40 is fixably mounted to each opposite side of the seat 2. In FIG. 4 the seat back 5 and the seat base 6 are each shown covered with padding and upholstery. In FIGS. 5 and 6 the padding and upholstery has been removed. A recline handle 41 is mounted to the seat back 5 to enable the seat back 5 to reclined relative to the stroller 1 and the seat base 6. Operation of the recline handle 41 is described below.

Figure 9:
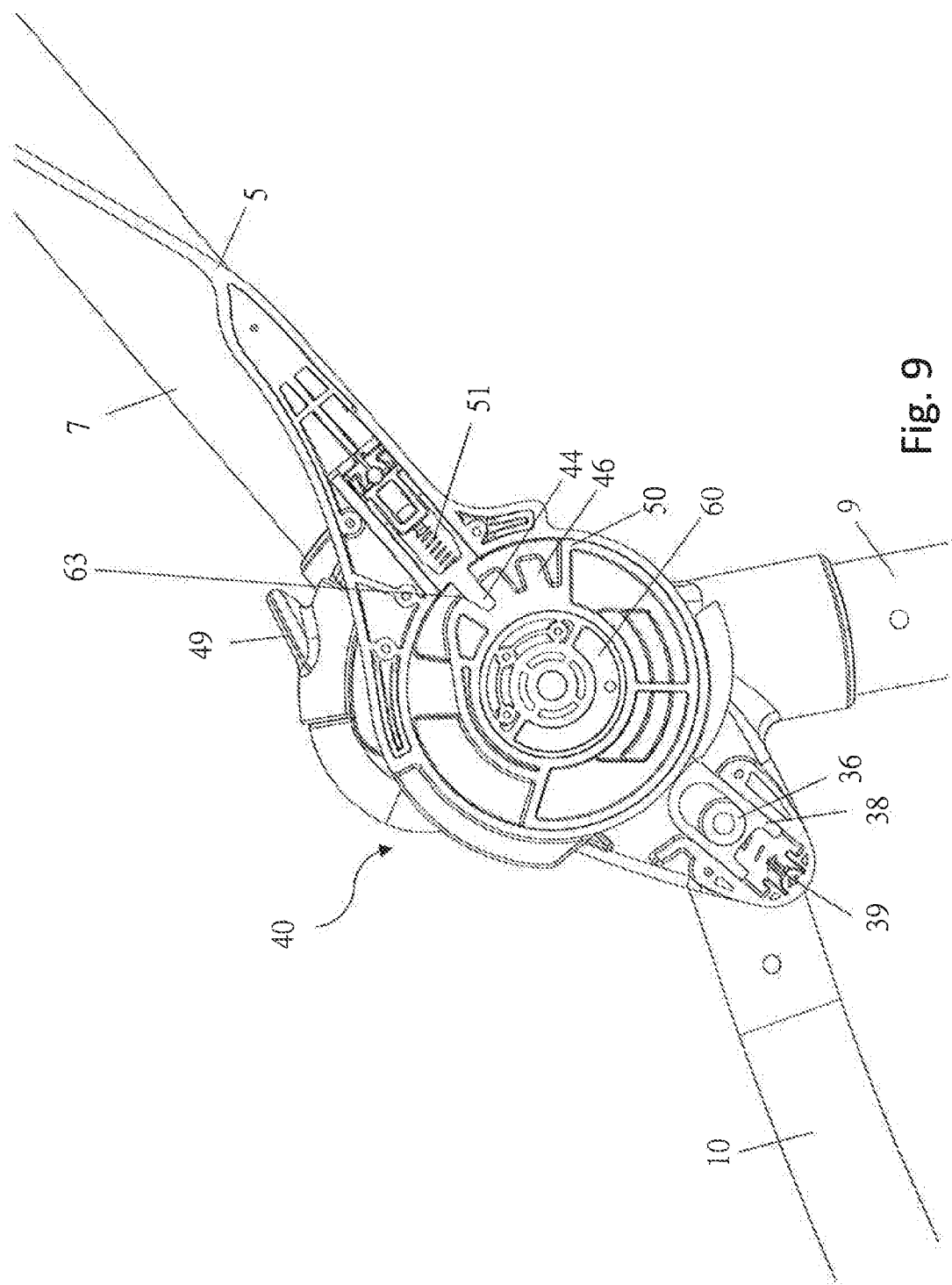
FIG. 9 is a cross sectional view of the seat hub shown in FIGS. 7 and 8 attached to the frame of the stroller, with the locking member in a locked position and the seat back in a deployed state.
Figure 10:
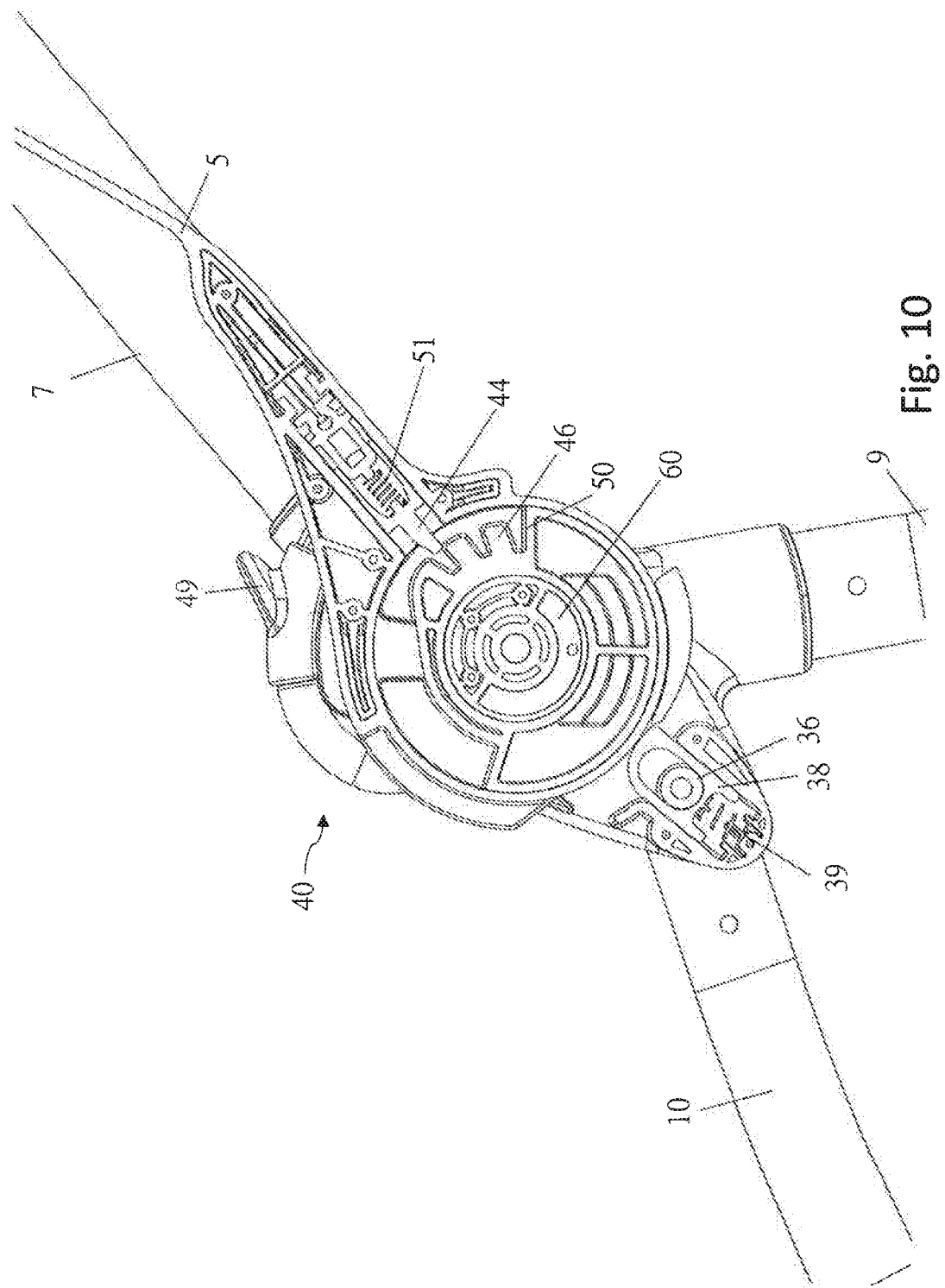
FIG. 10 is a cross sectional view of the seat hub of FIGS. 7 to 9, with the locking member in an unlocked position so that the seat back can be reclined.
Figure 11:
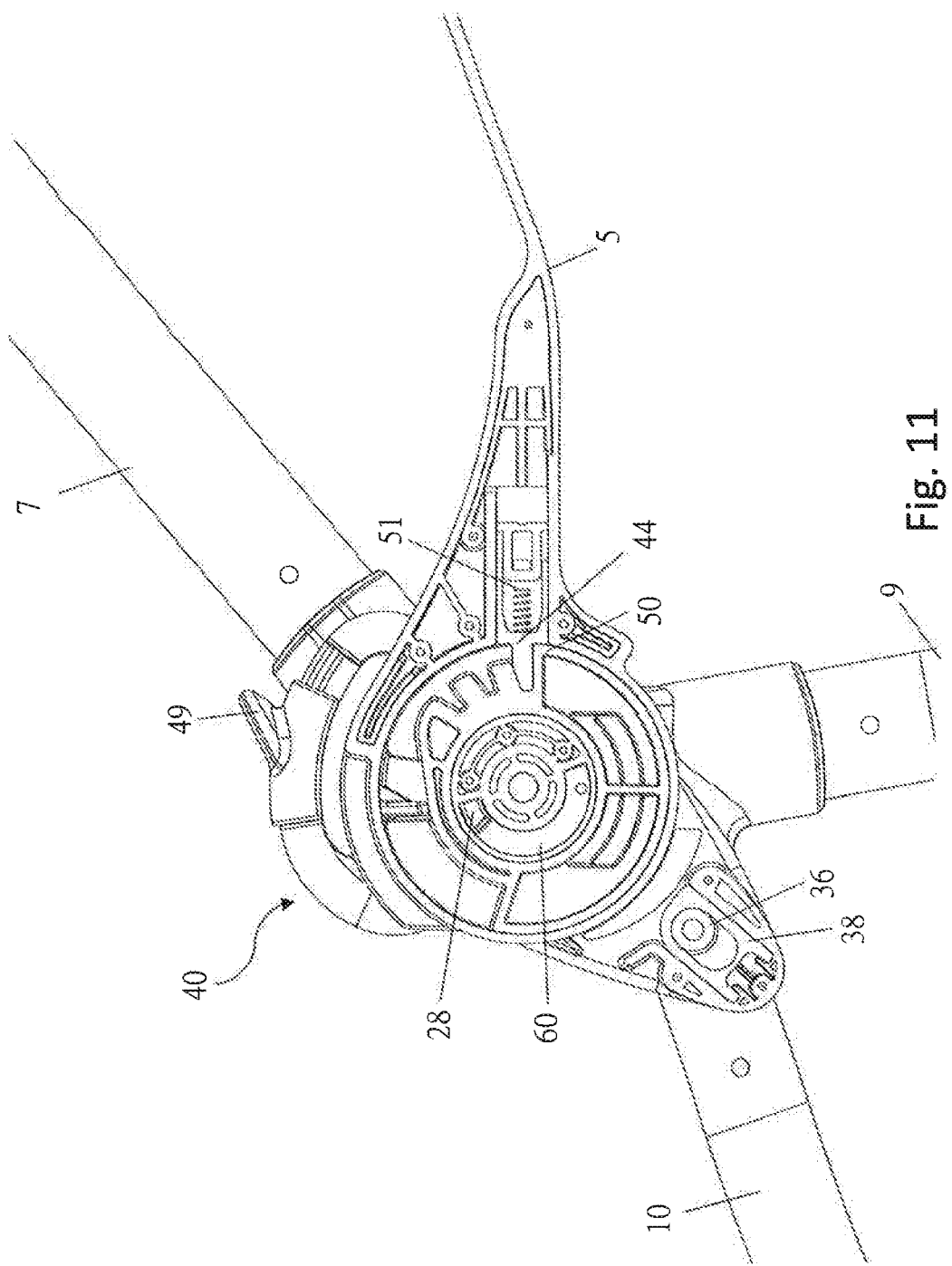
FIG. 11 is a cross sectional view of the seat hub of FIGS. 7 to 10, with the locking member in a locked position and the seat back in a third, fully reclined position.
Figure 12:
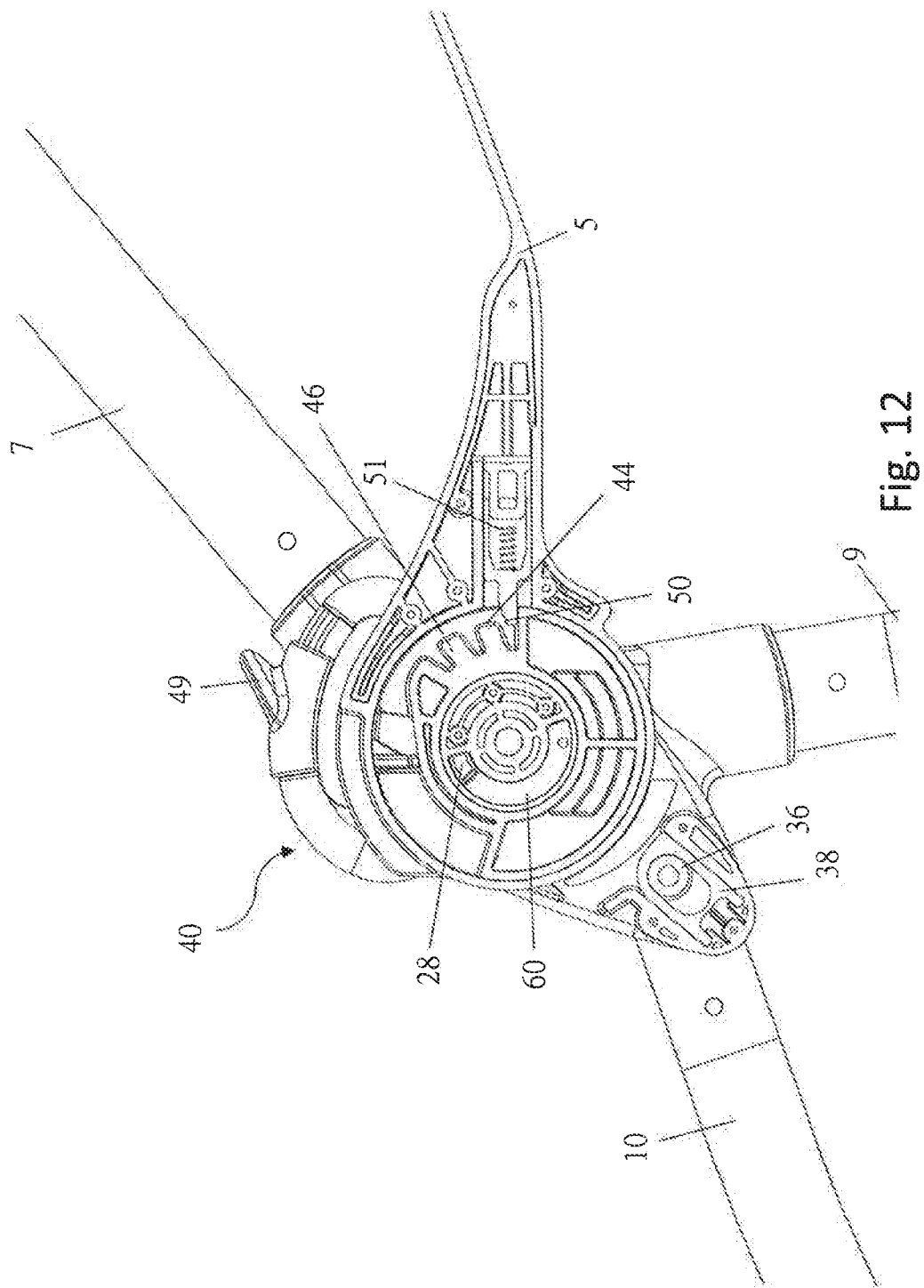
FIG. 12 is a cross sectional view of the seat hub of FIGS. 7 to 11, with the locking member in an unlocked position and in contact with a recline stop.
Figure 13:
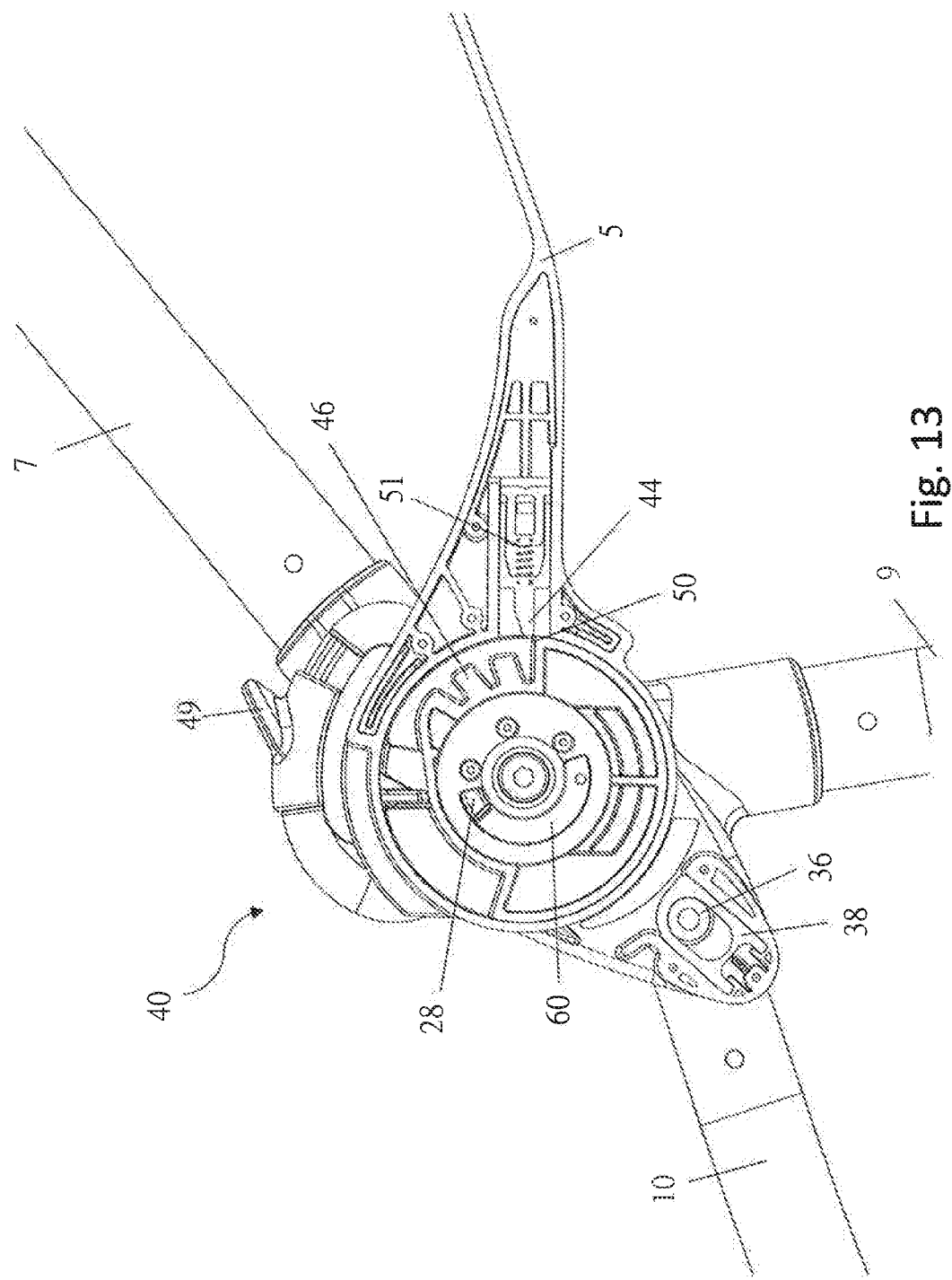
FIG. 13 is a cross sectional view of the seat hub of FIGS. 7 to 12, with the locking member in a fully unlocked position and pushed beyond the recline stop so that seat back and thus the seat is able to be folded onto its stowed position.
Figure 14:
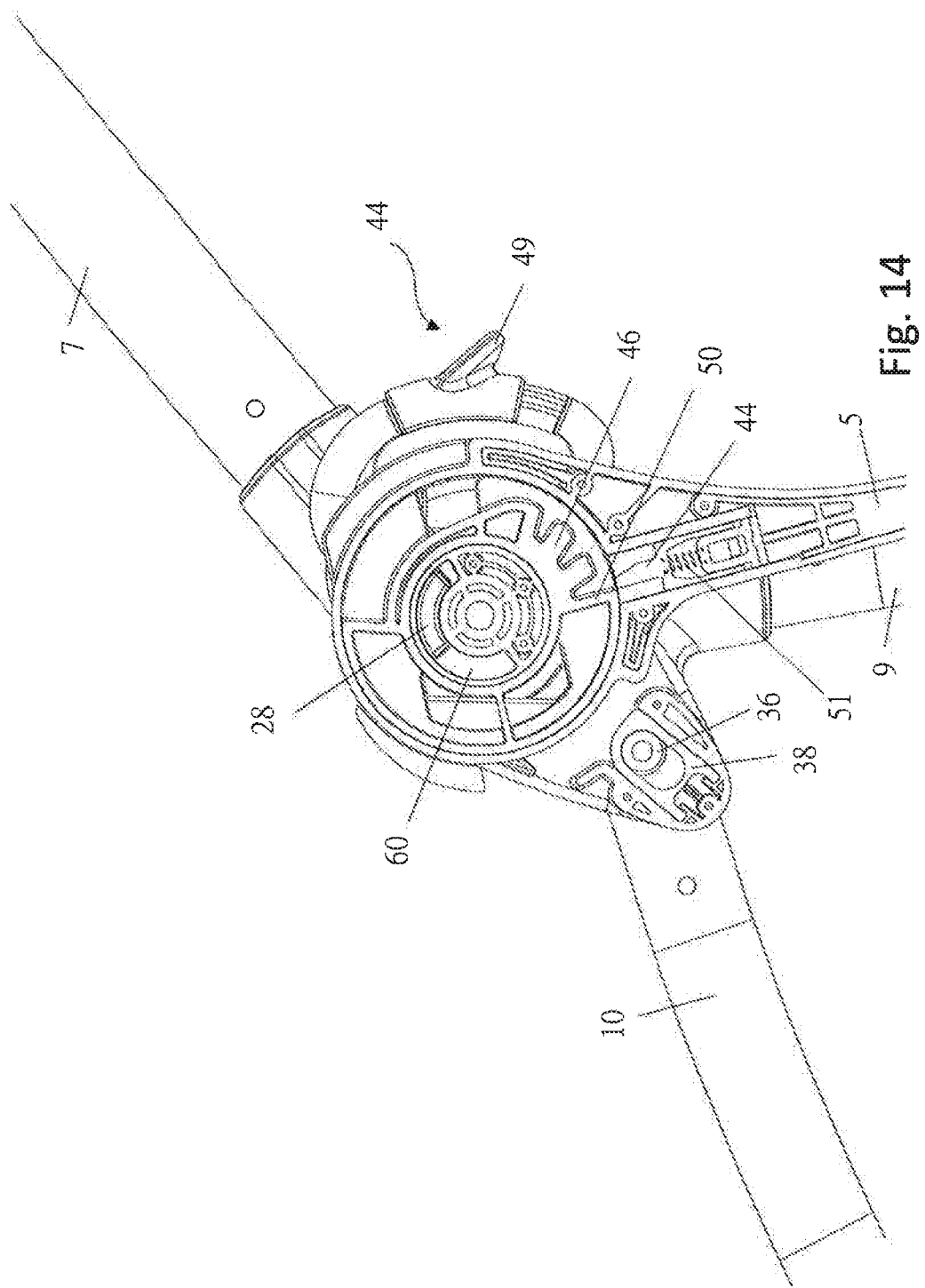
FIG. 14 is a cross sectional view of the seat hub of FIGS. 7 to 13, with the seat base and seat back in a folded state, parallel to one another, and in their stowed position, resting against the rear legs of the stroller.

Referring particularly to FIGS. 7-14, each seat hub 40 comprises a recline mechanism 42 comprising a locking member 43 which is formed with first 44 and second 45 locking elements adjacent one another. The first locking element 44 is engageable with a plurality of teeth 46 formed into the seat hub 40 in order to lock the seat back 5 in a user selected recline position. In this embodiment, there are two teeth 46 and so three recline positions are available. Indeed, FIG. 9 shows the seat back 5 in a first recline position and FIG. 11 shows the seat back 5 in a third recline position. The recline mechanism 42 further comprises a cable 48 connected to the recline handle 41. When the recline handle 41 is pulled, the first locking element 44 disengages from the teeth 46 to allow the user to select a new seat back 5 recline position (see FIG. 8). When the recline handle 41 is released, a biasing means in the form of a spring 47 pushes the first locking element 44 back into engagement with a tooth 46 of the seat hub 40 in order to again lock the seat back 5 in position (see FIG. 7).

A recline stop 50 is provided to prevent the seat back 5 from normally being reclined back beyond its maximum recline position by blocking movement of the first locking member 43 and, hence, seat back 5 regardless of whether the recline handle 41 is pulled or released.

The locking member 43 comprises first and second pieces 43a, 43b which are slidably engaged with one another such that the first piece 43a can move relative to the second piece 43b to allow a small range of additional movement of the locking member 43 away from the seat hub 40. Thus, movement of the first piece 43a toward the second piece 43b enables movement of the first locking element 44 beyond that achievable by only pulling the recline handle 41, to allow the first locking element 44 to move beyond the recline stop 50, when the seat base 6 is moved so that the seat is in its folded state, as will be explained below, which then allows for the seat back 5 to be moved to its stowed position. A biasing means in the form of a spring 51 is provided to urge the first piece 43a away from the second piece 43b toward its extended position.

Each seat hub 40 further comprises a switch 49 for engaging and disengaging a connected seat locking member 59 (shown in FIGS. 18 and 19) with the recess 34 shown in FIG. 3 in order to secure the seat 2 to the frame 3. In an alternative embodiment the seat locking member may be resiliently biased towards an engaged position and the switch used to move it to a disengaged position.

The seat hub 40 also comprises a plate 61 formed with an arcuate aperture 60. When the seat is in a deployed state ready for use the plate 61 blocks the path of the arcuate protrusion 28 through the curved opening 36, which prevents the handle 7 from being folded to its folded state (see e.g. FIG. 13). However, when the seat back 5 and the seat base 6 are in the folded state and stowed position, the arcuate aperture 60 aligns with the arcuate opening 36, opening a path for the arcuate protrusion 28 to protrude through the curved opening 36, which allows the handle 7 to be folded into its folded state by twisting the twist grip portion 19 in the manner described above.

Figure 15:
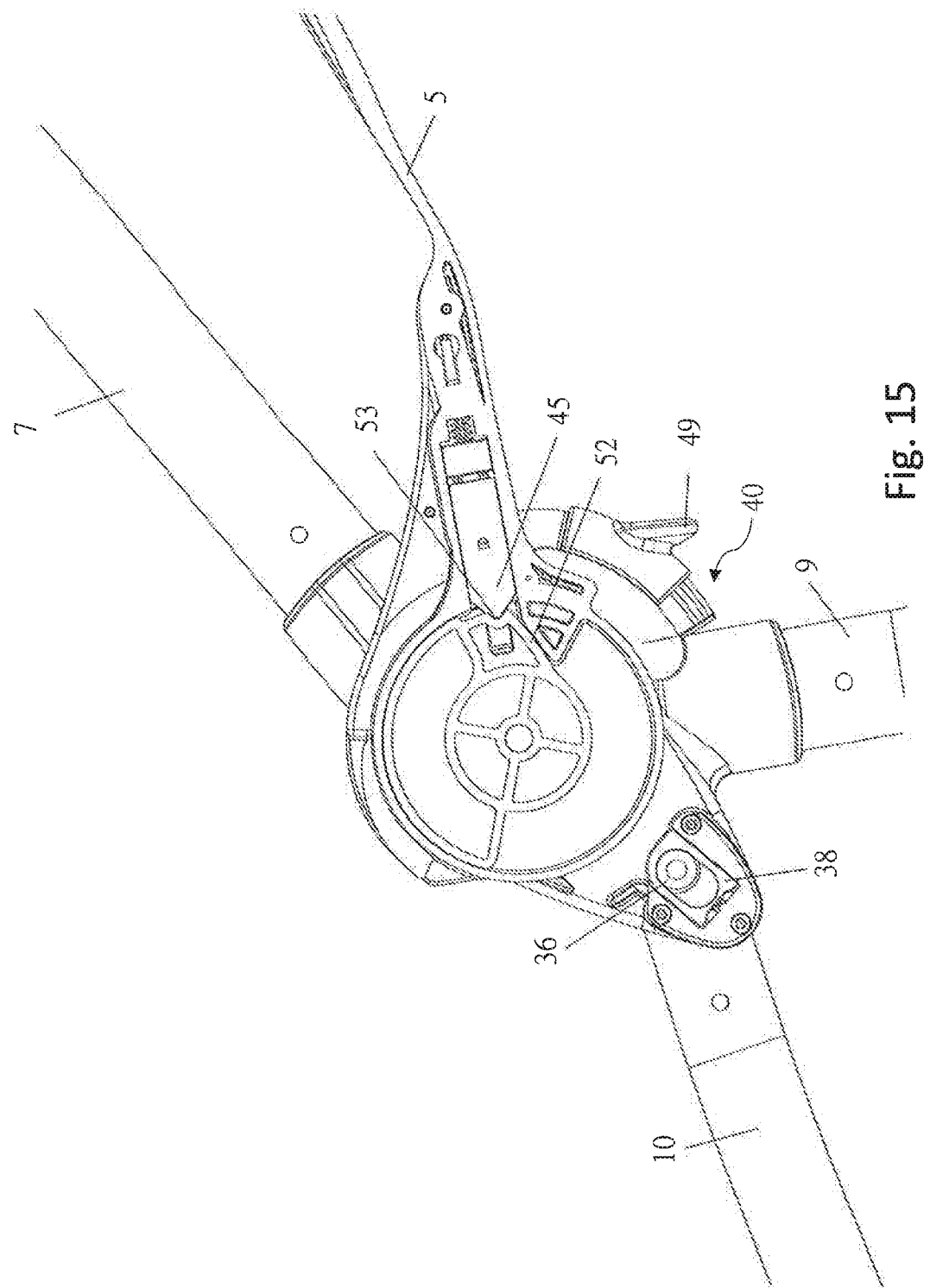
FIG. 15 is a cross sectional view of the seat hub of FIGS. 7 to 14 showing the interaction between the locking member and an cam profile formed on the seat base.

Referring particularly to FIG. 15, the seat base 6 (not shown in FIG. 15 for clarity) is attached to a cam profile 52 which defines a ramp and a groove 53. The cam profile 52 is arranged such that when the seat base 6 is in its deployed state it is spaced away from the second locking element 45. However, when the seat base 6 is lifted so that it is adjacent and/or substantially parallel to the seat back 5, the cam profile 52 is rotated about the centre of the seat hub 40 and contacts with an edge of the second locking element 45. This edge acts as a cam follower, such that rotation of the seat base relative to the seat back into the folded state urges the second locking element 45 away from the seat hub 40 which also moves the coupled first locking element 44 and, hence, first piece 43a away from the teeth 46 of the seat hub 40 toward and into the second piece 43b, thereby moving the first locking member 44 further than is possible by actuating the recline handle 41, beyond the edge of the recline stop 50. This movement allows the seat back 5 to be moved beyond its third recline position towards its stowed position, since the recline stop 50 no longer prevents it from over rotating about the seat hub 40.

As the seat is moved into its folded state the edge of the second locking element 45 enters the groove 53 in the cam profile 53 which holds the seat in its folded state.

Figure 16:
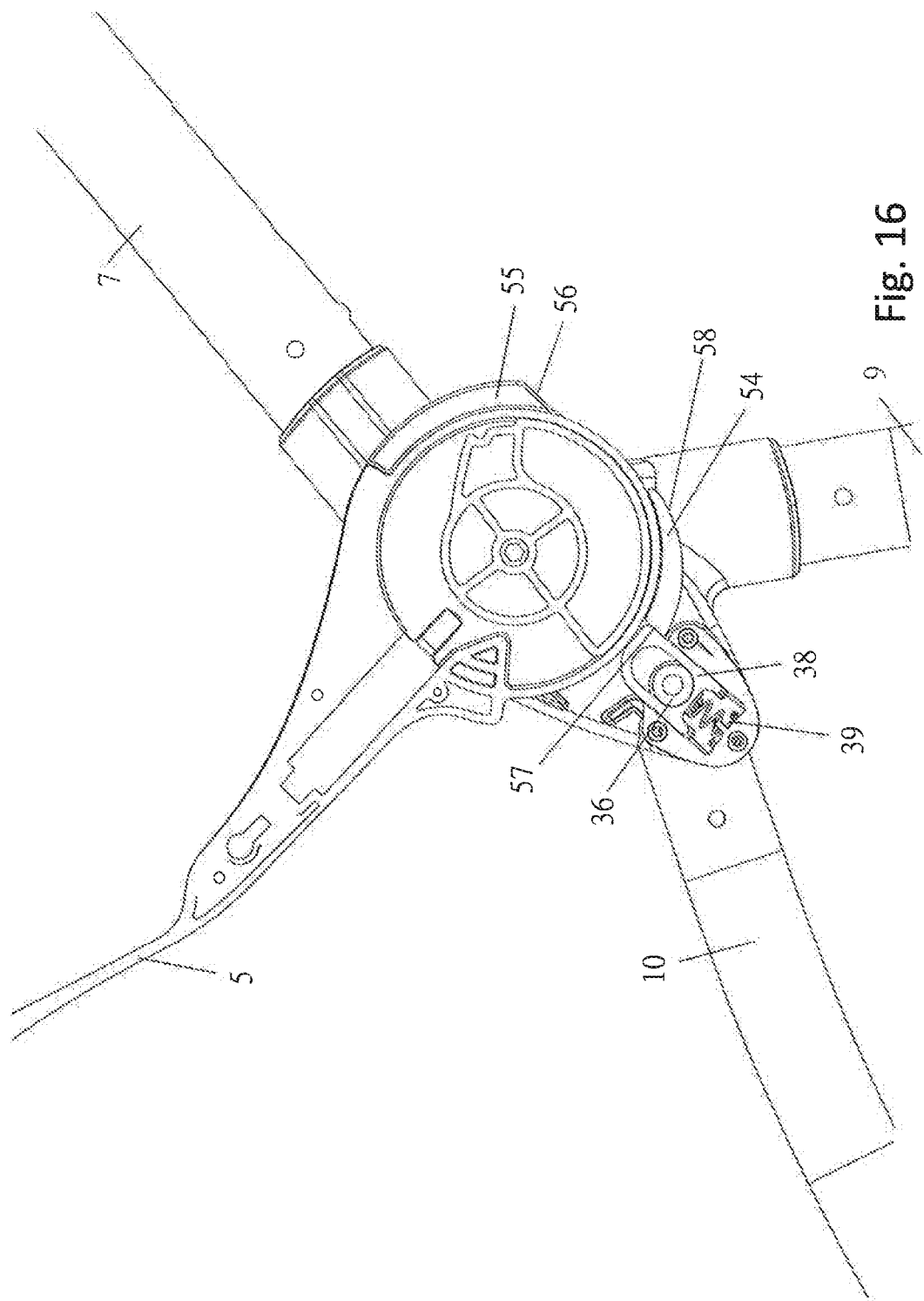
FIG. 16 is a cross sectional view of the seat hub when in an alternate orientation, in which the seat is in a rear facing orientation.
Figure 17:
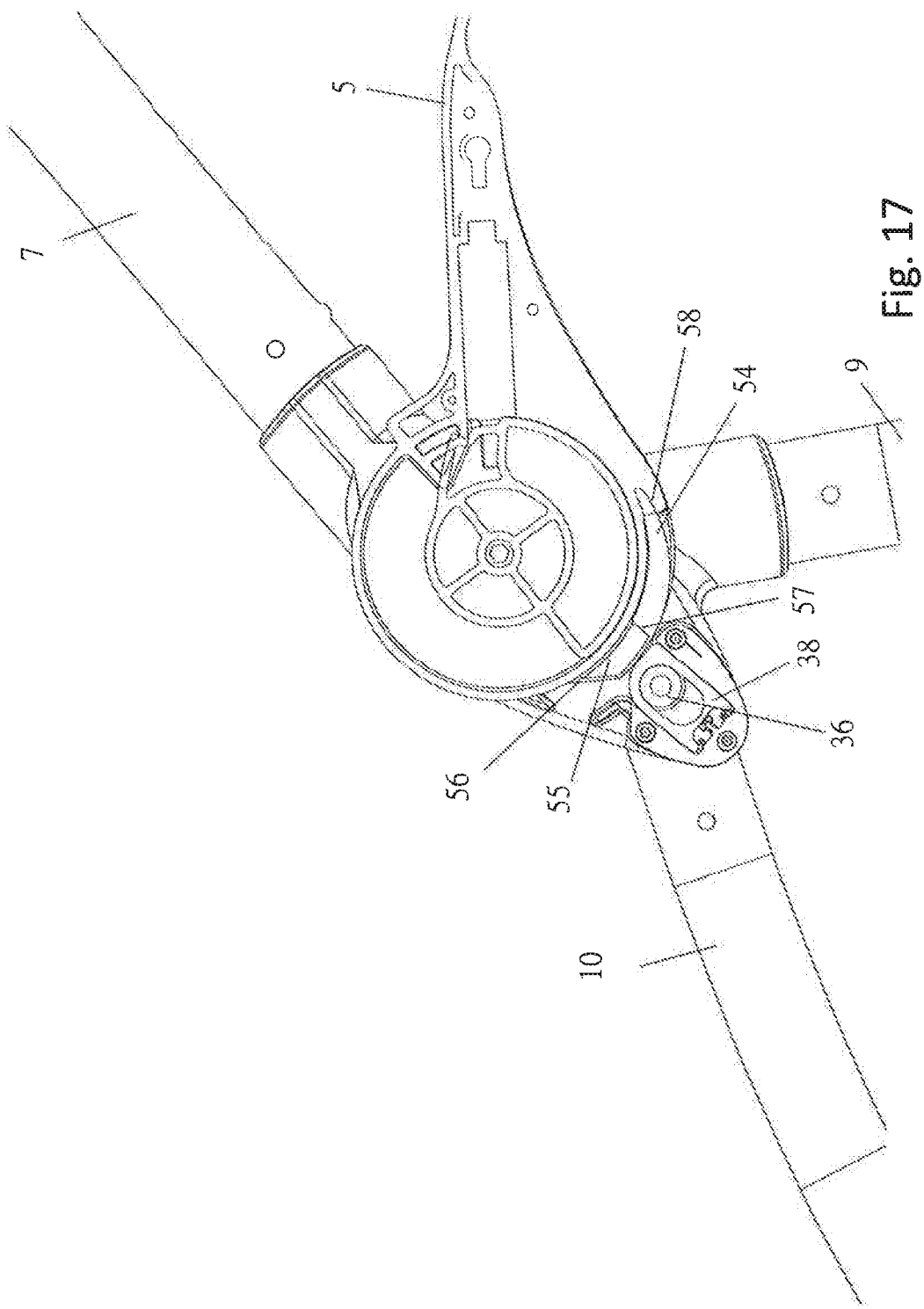
FIG. 17 is a cross sectional view of the seat hub of FIG. 16 showing the interaction between the seat back protrusion and the rear facing stop.

Referring to FIGS. 16 and 17, the seat 2 is shown mounted in a rear facing orientation in which it faces towards the person pushing the stroller 2. The seat back 5 comprises a seat back protrusion 55 formed thereon such that it rotates about the seat hub 40 towards the moveable rear facing stop 38 as the seat back 5 is moved from the deployed state to the folded state. The seat back protrusion 55 comprises an angled surface 56. The seat base 6 (not shown in FIGS. 16 and 17 for clarity) comprises a seat base protrusion 54 formed thereon such that it rotates about the seat hub 40 towards the moveable rear facing stop 38 as the seat base 6 is moved from the folded state to the deployed state. The seat base protrusion 54 is wedge shaped and comprises a flat abutting surface 57 and an angled surface 58.

The seat back protrusion 55 and the seat base protrusion 54 have substantially the same height and are located in different axial planes to one another such that they may rotate about the seat hub 40 independently.

In the deployed state shown in FIG. 16, the abutting surface 57 of the seat base protrusion 54 is adjacent and in contact with the rear facing stop 38, which physically blocks the seat base 6, and thus the seat 2, from being moved to the stowed position. The seat back protrusion 55 is spaced away from the rear facing stop housing 38.

Figure 18:
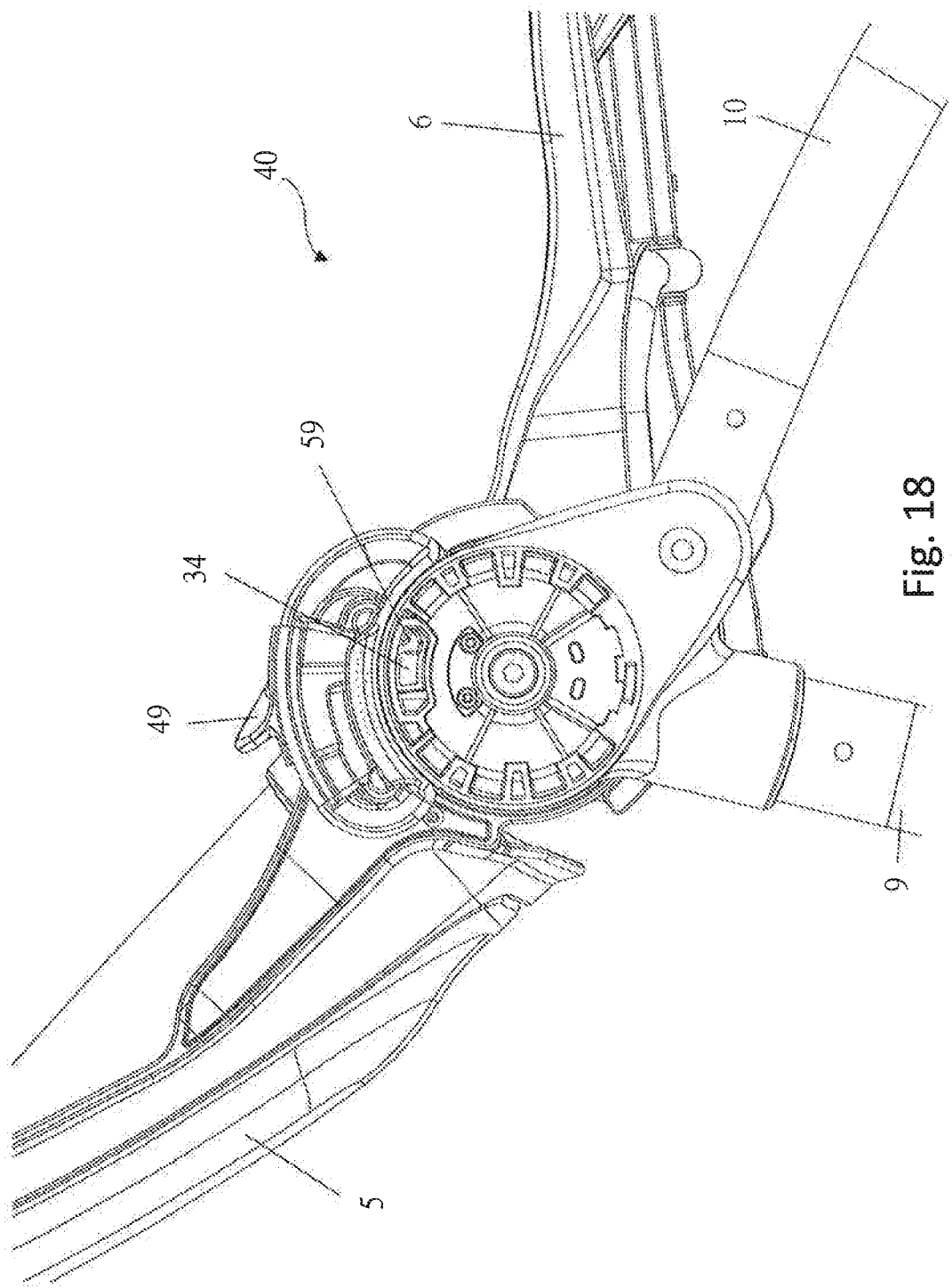
FIG. 18 is cross sectional view of the seat hub of FIGS. 16 and 17 showing a mechanism that releasably secures the seat to the frame of the stroller, with the seat locking member depicted in a locked position.
Figure 19:
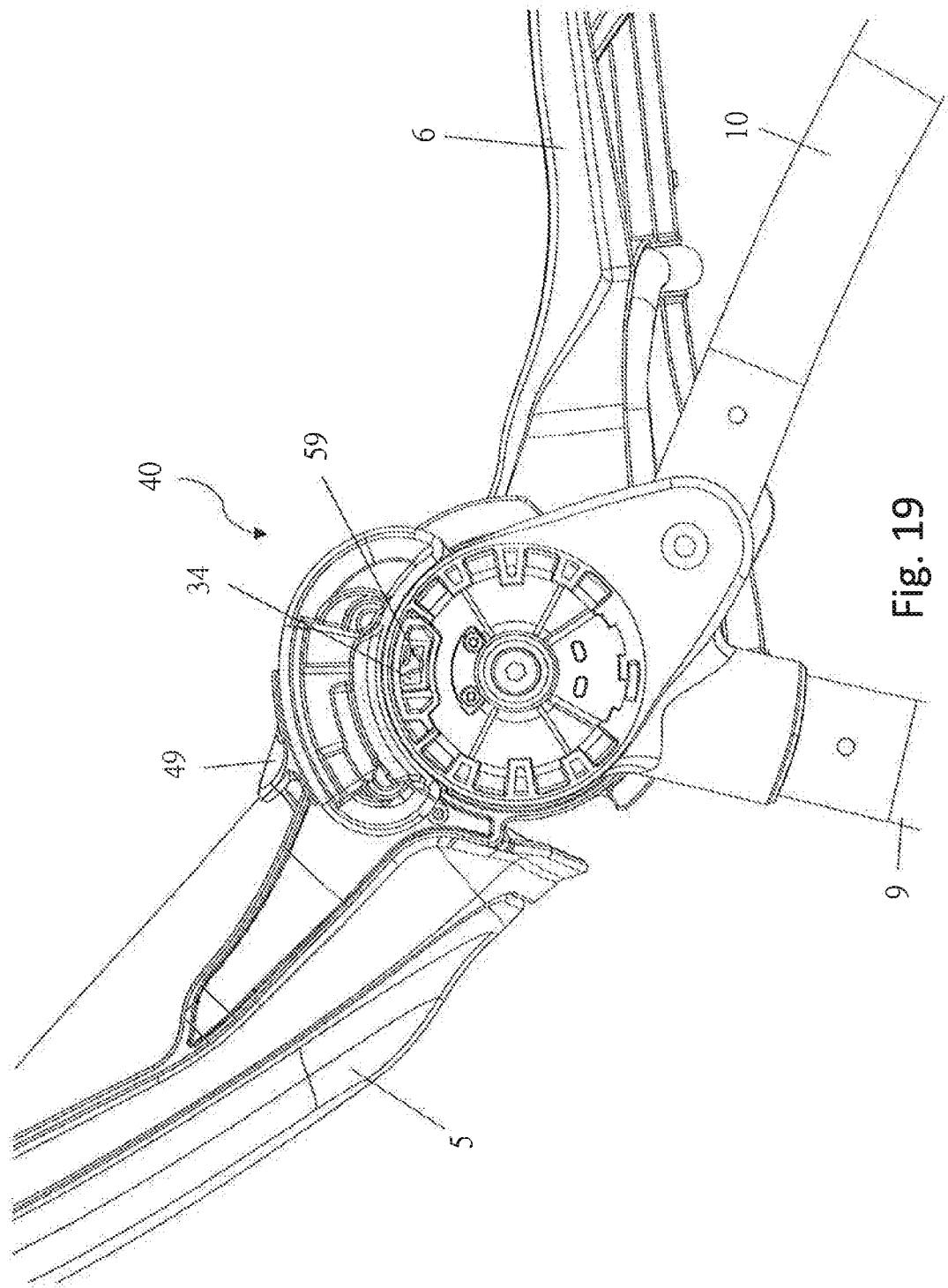
FIG. 19 is cross sectional view of the seat hub of FIG. 18 showing seat locking member in an unlocked position, allowing the seat to be released from the frame.

Referring particularly to FIGS. 18 and 19, further details are shown of how the seat hub 40 attached to the seat 2 locks to the frame 3, which thus secures the seat 2 to the frame 3. The switch 49 on the seat hub 40 is slidable relative to the seat hub 40 and is connected to a seat locking member 59.

FIG. 18 shows the seat locking member in a locked position where it is engaged with a part of the recess 34 in the seat mounting mechanism 21. Thus, in FIG. 18 the seat 2 is locked to the frame 3.

FIG. 19 shows the seat locking member 59 in an unlocked position where it is disengaged with a part of the recess 34 in the seat mounting mechanism 21. Thus, in FIG. 19 the seat 2 may be lifted off of and removed from the frame 3.

In order to unlock the seat 2 from the frame, the switch 49 is operated by sliding it towards the seat back 5, which disengages the seat locking member 59 from the recess 34. This allows the seat 2 to be removed from the stroller 1 and its orientation changed if required. It will be appreciated that in order for the seat 2 to be fully unlocked from the frame 2, the switches 49 on both seat hubs 40 attached to the seat 2 must be operated at the same time.

In use, referring particularly to FIGS. 20a to 22g, the stroller 1 is movable between its fully deployed state (FIGS. 20a and 22a) and its fully collapsed state (FIGS. 21 and 22g), without removing the seat 2 from the frame 3 and with the seat 2 in either the front facing orientation (FIGS. 20a-21) or the rear facing orientation (FIGS. 22a-22g).

Figure 20A:
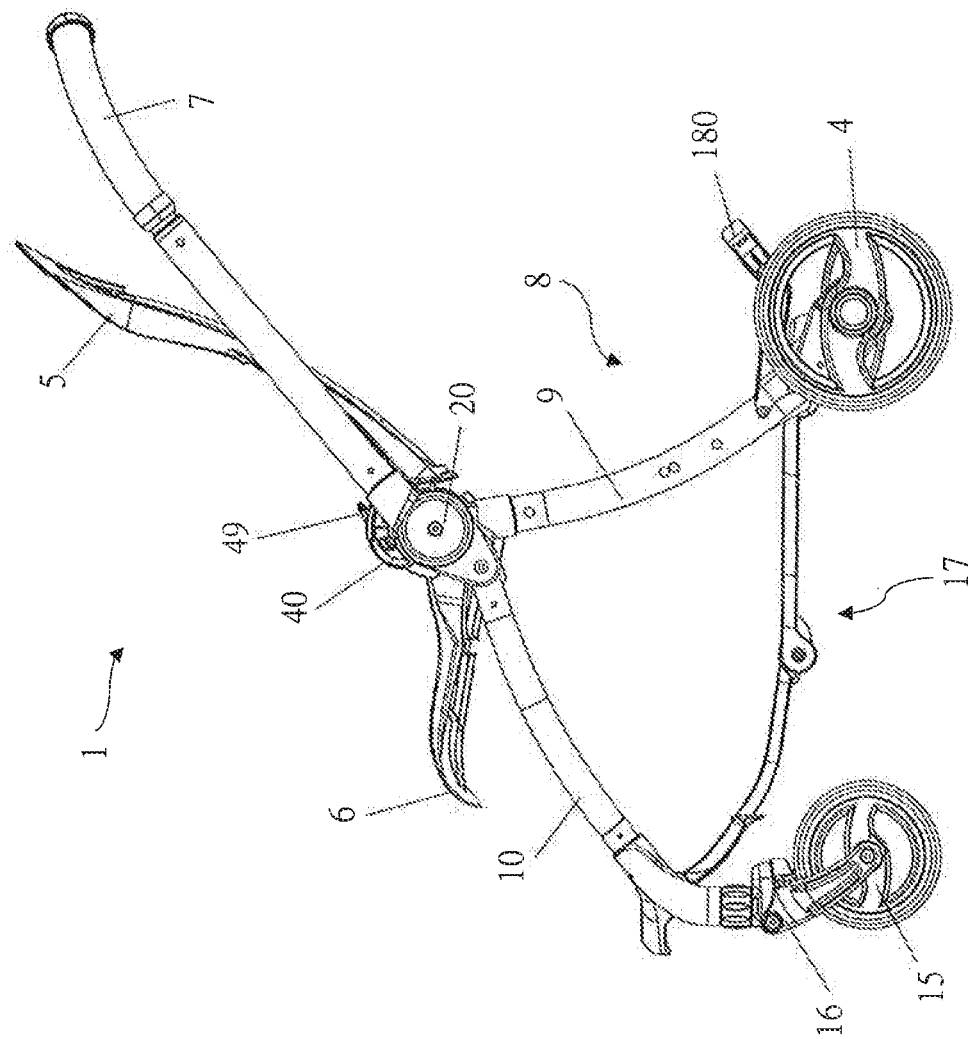
FIG. 20a is a side view of the stroller shown in FIGS. 1 to 19 in fully deployed state with the seat in a fully deployed state, first recline position and forward facing orientation.
Figure 20B:
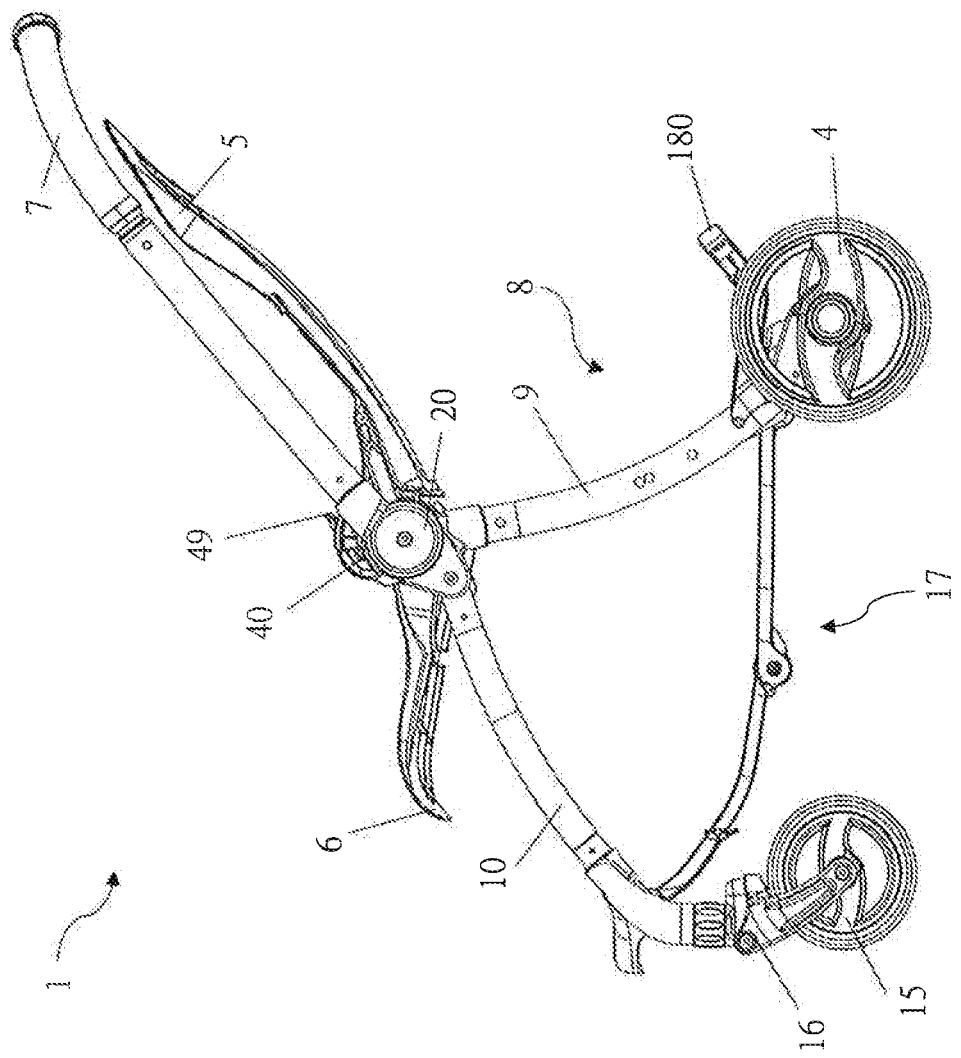
FIG. 20b is a side view of the stroller of FIG. 20a with the seat in a second (mid) recline position.
Figure 20D:
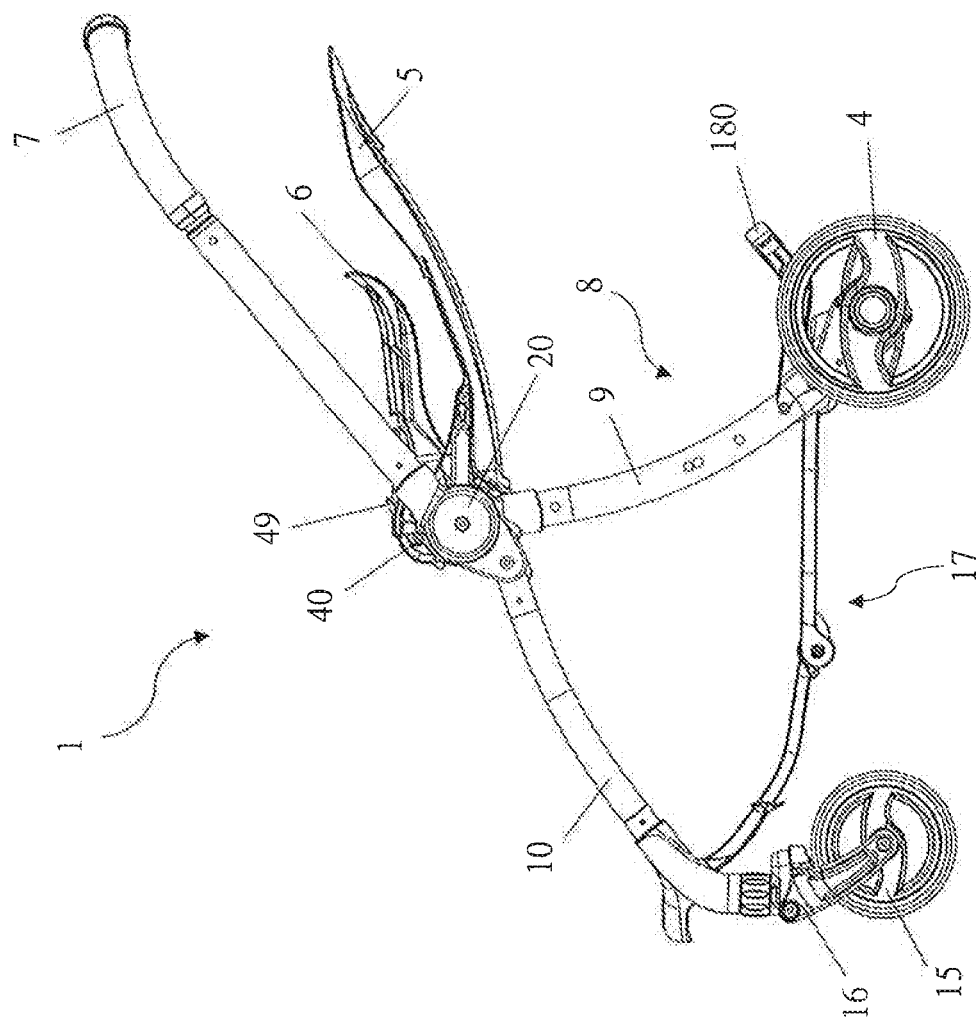
FIG. 20d is a side view of the stroller of FIG. 20a with the seat in a folded state, where the seat base has been rotated so that it is parallel with the seat back, in preparation for folding.
Figure 20E:
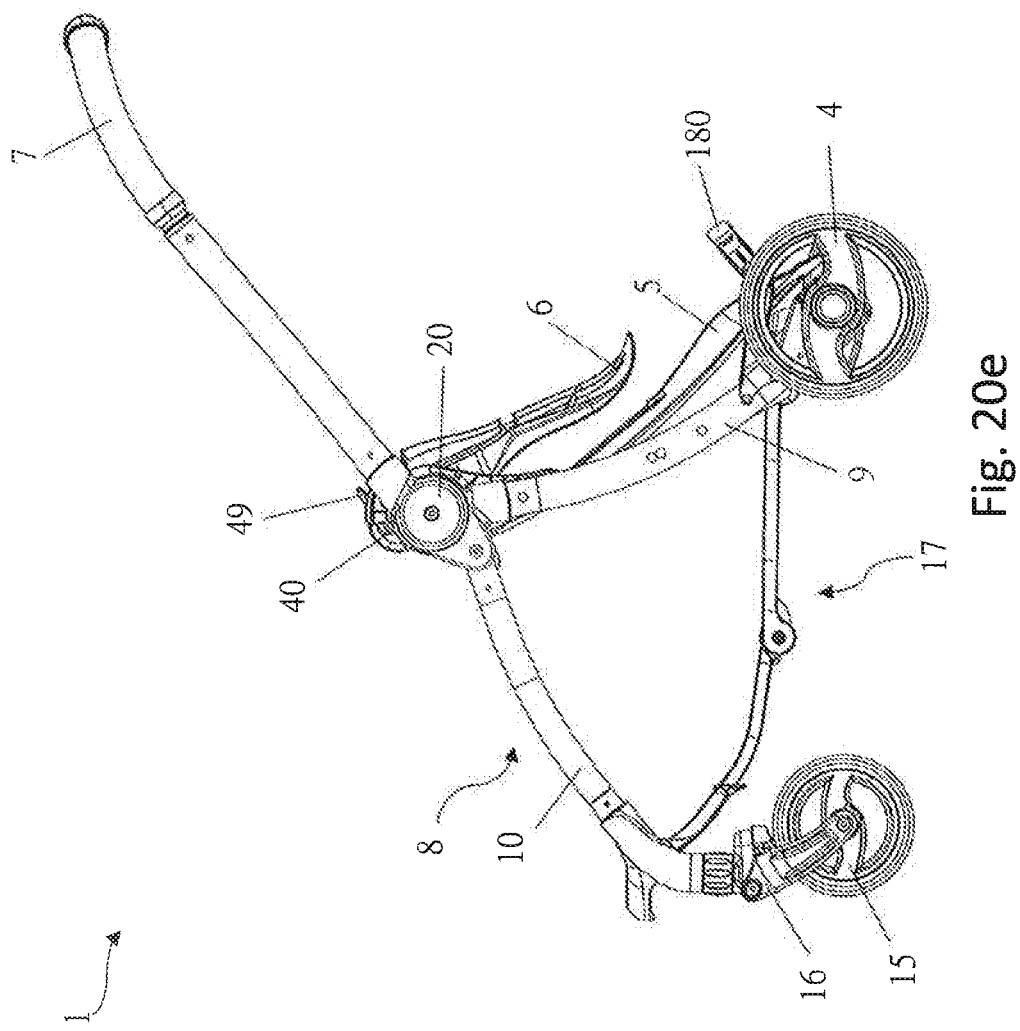
FIG. 20e is a side view of the stroller of FIG. 20a with the seat in a stowed position, towards the rear legs of the stroller.
Figure 20F:
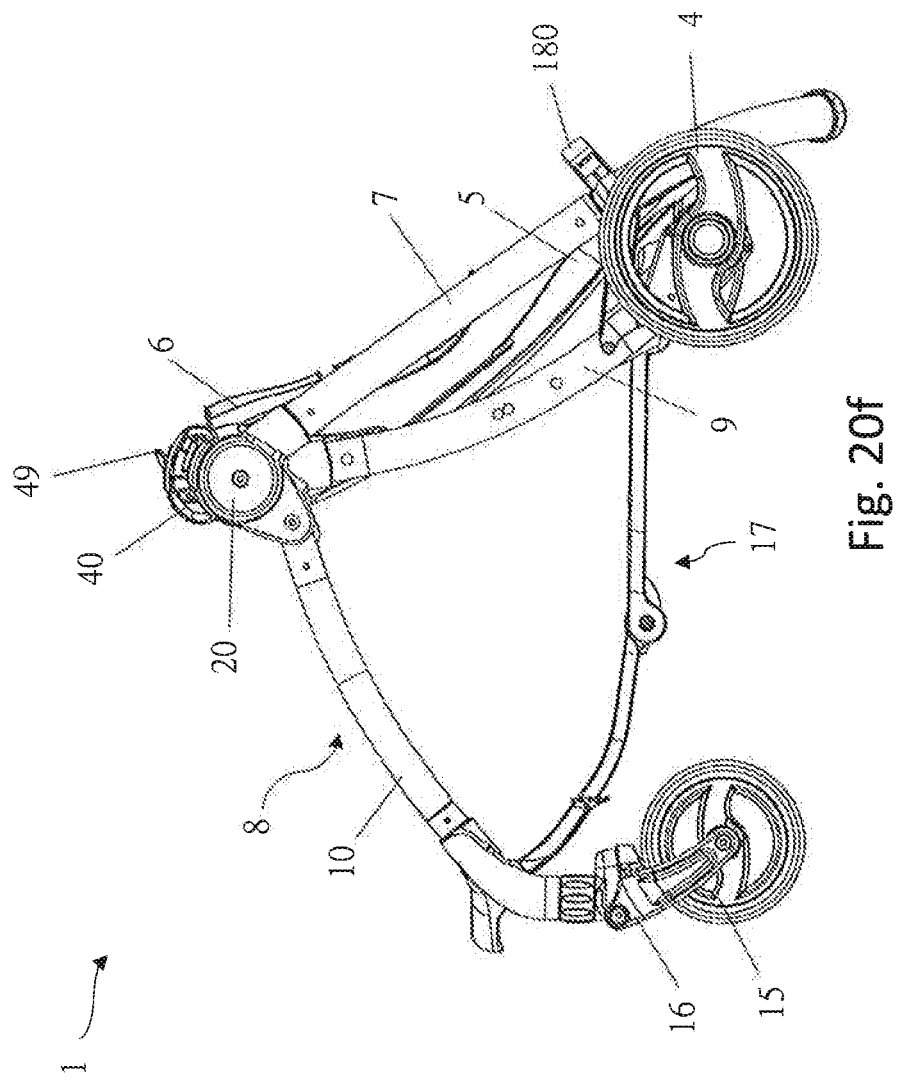
FIG. 20f is a side view of the stroller of FIG. 20a with the handle in a folded state, towards the rear legs of the stroller.
Figure 20G:
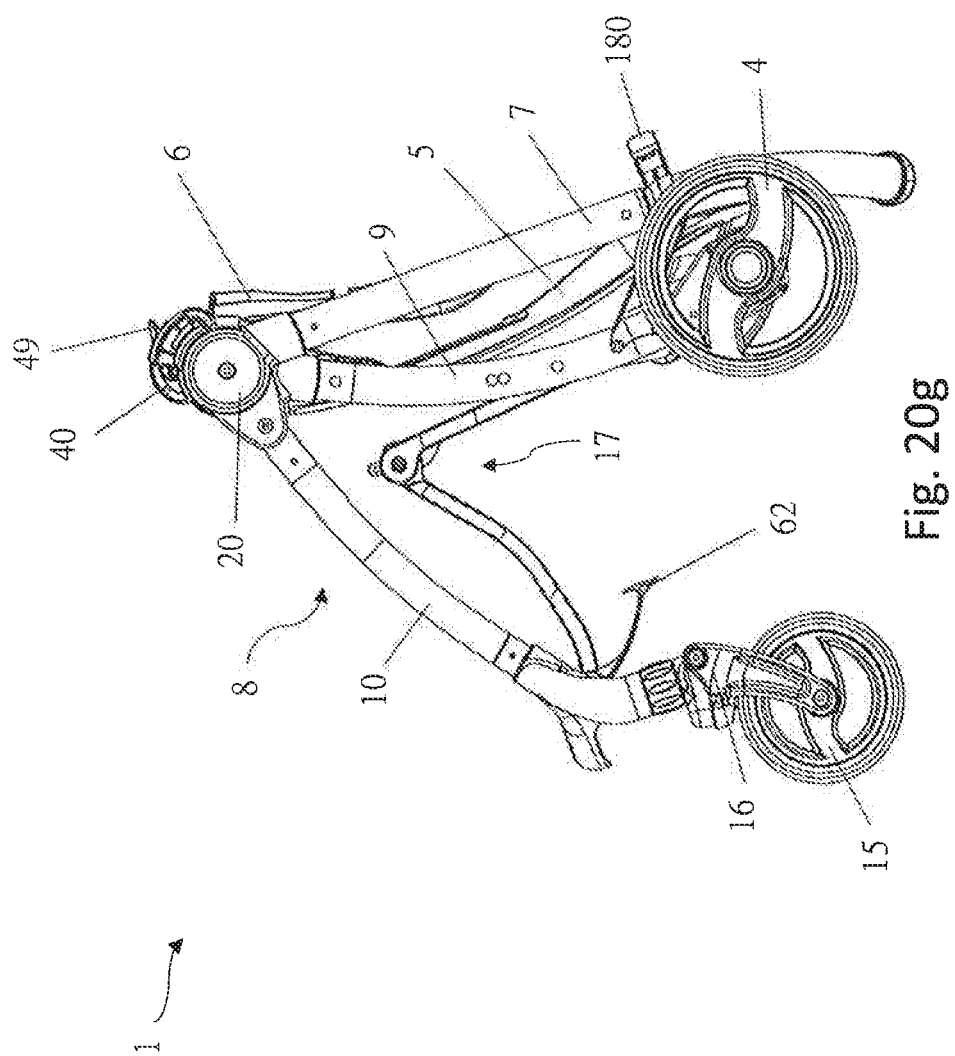
FIG. 20g is a side view of the stroller of FIG. 20a with legs in a partially folded state.
Figure 21:
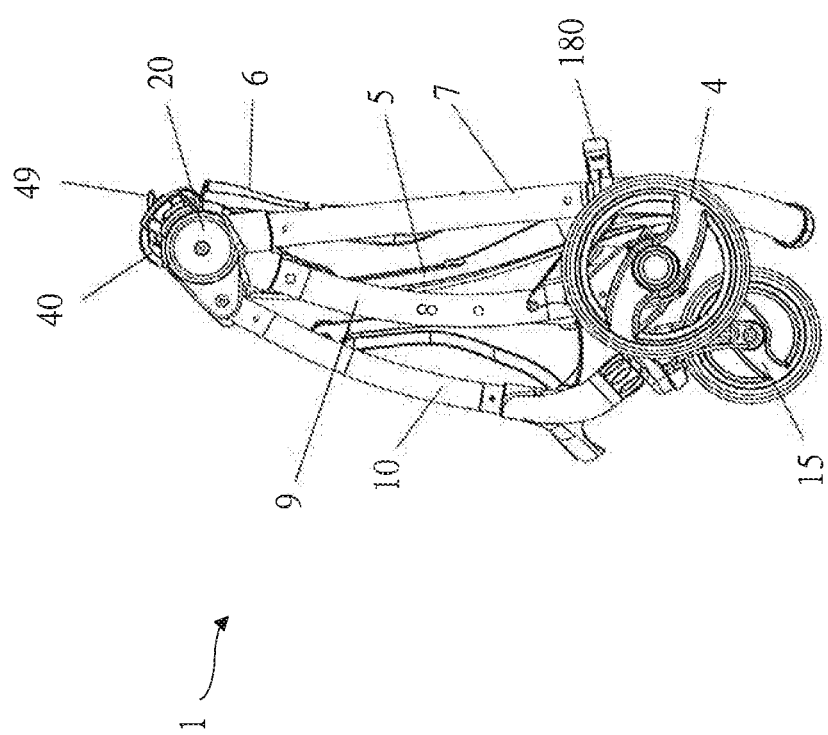
FIG. 21 is a side view of the stroller shown in FIGS. 20a to 20g in a fully collapsed state.

Referring particularly to FIGS. 20a-21, the process of folding the stroller 1 from its fully deployed state to its fully collapsed state when the seat 2 is in a forward facing orientation will now be described.

The first step is to lift the seat base 6 upwards so it rotates about the seat hub 40 towards the seat back 5 so that it is substantially parallel to the seat back 5, putting the seat into the folded state shown in FIG. 20d. This is only possible if the seat 2 is empty and therefore cannot be done accidentally if a child is sat in the seat 2. This movement rotates the cam profile 52 formed on the seat base 6 about the seat hub 40, towards the seat back 5, where it contacts the cam follower formed by the second locking element 45 and lifts it away from the seat hub 40, which consequently lifts the coupled first locking element 44 clear of the edge of the recline stop 50.

The second step is to rotate the seat back 5 and the seat base 6 together towards the rear legs 9 to the folded state shown in FIG. 20e. This aligns the arcuate aperture 61 into alignment with the arcuate aperture 38.

The third step is to fold the handle 7 towards the rear legs 9 into its folded state as shown in FIG. 20f. This is possible because alignment of the arcuate apertures 61 and 38 allows the arcuate protrusion 28 to be pushed through the curved opening 38 by rotating the twist grip portion 19. As described above, this action pushes the cog 25 out of its engagement with the castellations 26 of the handle adjustment housing 23 and allows the handle 7 to be rotated to its folded state. The handle 7 is locked in this state by engagement of the handle 7 with a latch 180 extending from the rear leg 9 of the stroller 1.

The fourth step is to unlock and fold the lower basket support 17 by pulling a handle extending along the central pivot of the lower basket support 17 upwardly toward the hub 20 to move the front wheels 15 towards the rear wheels to put the stroller into its fully collapsed state as shown in FIG. 21. A lock 62 is used to secure the stroller 1 in the fully collapsed state, by fastening the front frame 10 to the handle 7.

In order to unfold the stroller 1 from its fully collapsed state to its fully deployed state, the procedure described above is reversed. In particular, the lock 62 is unlocked, the handle 7 is unlocked, by releasing the handle 7 from the latch 180, and lifted to its deployed state, and the seat back 5 and the seat base 6 are raised and then separated from one another into their deployed states.

Referring particularly to FIGS. 22a-22g, the process of folding the stroller 1 from its fully deployed state to its fully collapsed state when the seat 2 is in a rear facing orientation will now be described.

Figure 22A:
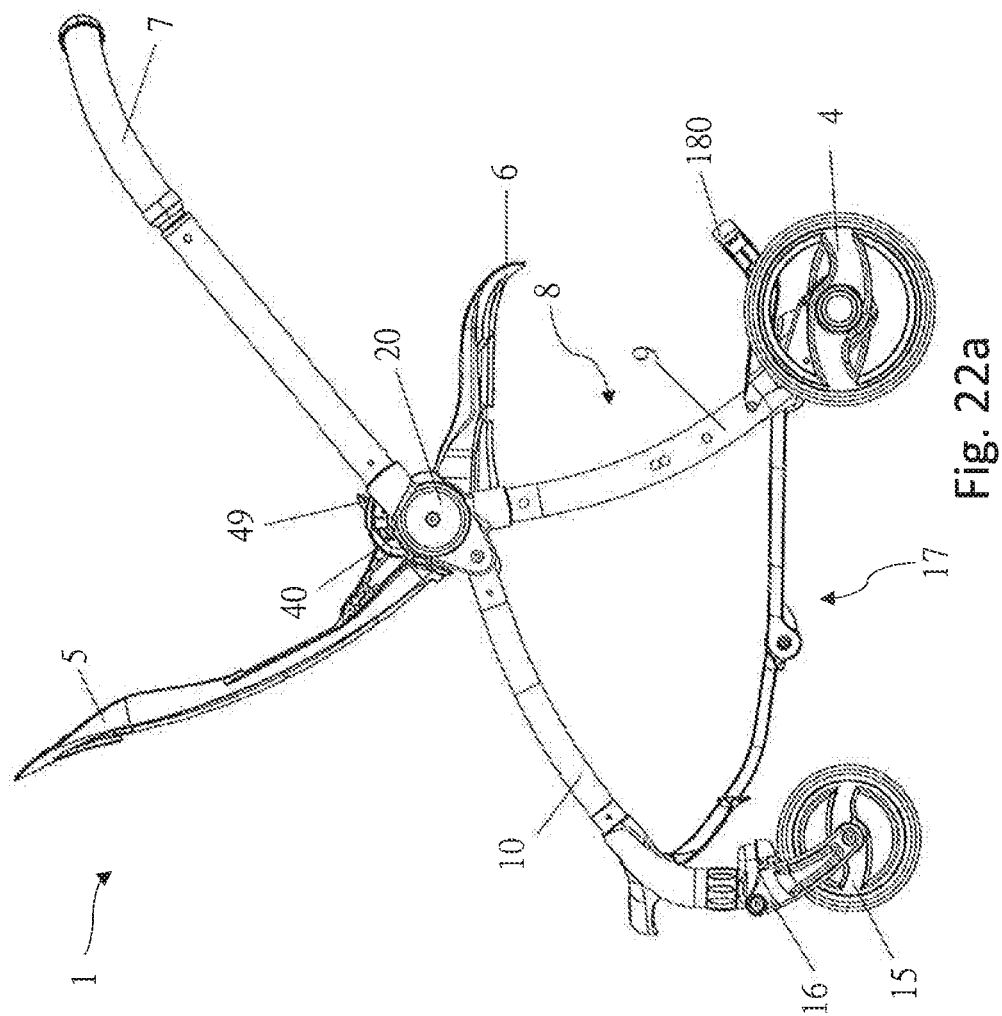
FIG. 22a is a side view of the stroller shown in FIGS. 1 to 19 in a fully deployed state with the seat in a fully deployed state, first recline position and rear facing orientation.
Figure 22B:
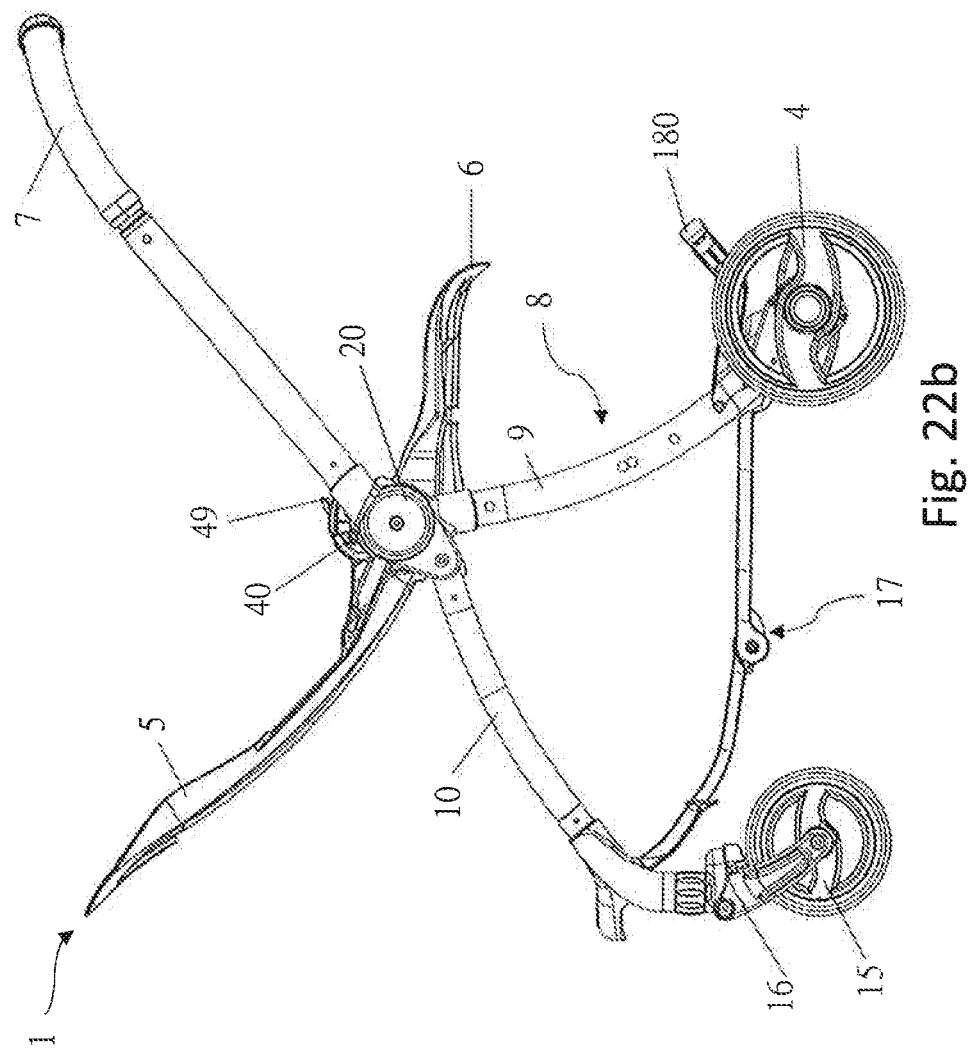
FIG. 22b is a side view of the stroller of FIG. 22a with the seat in a second (mid) recline position.
Figure 22C:
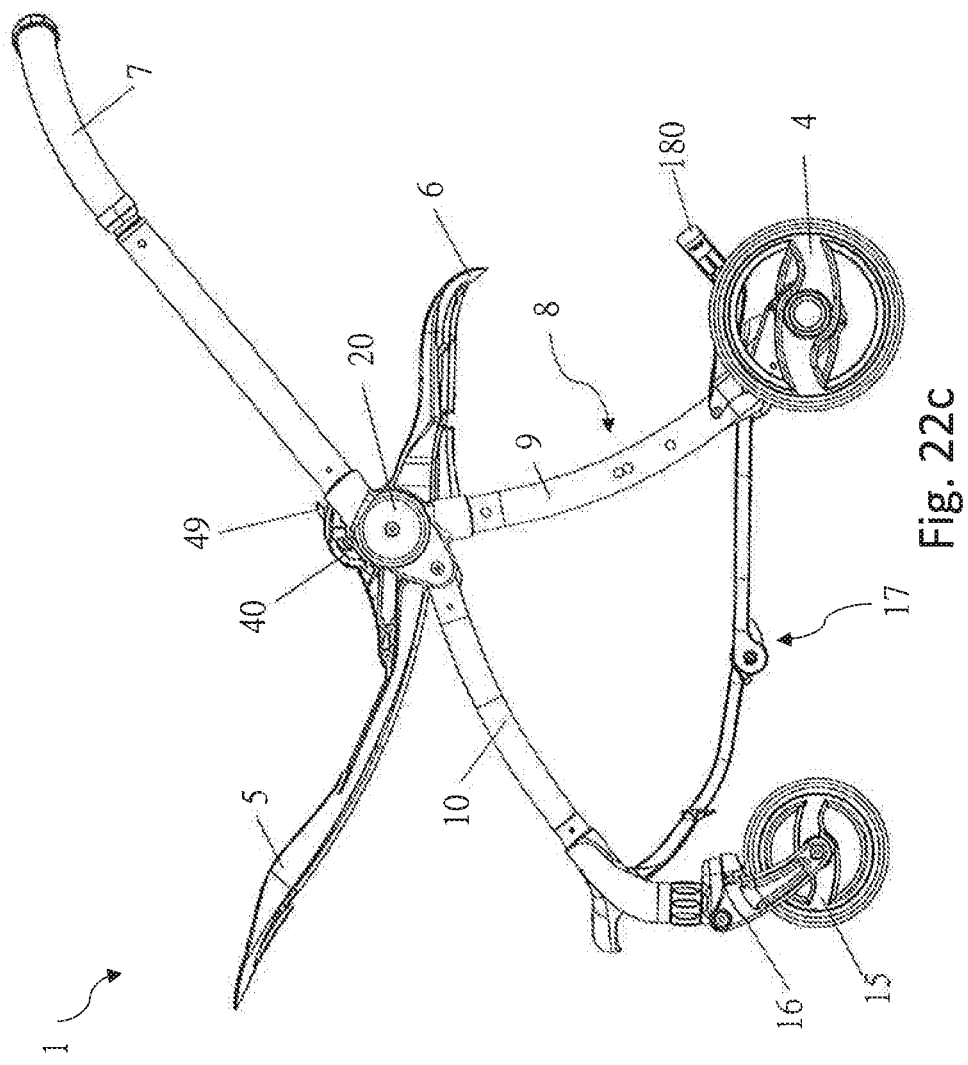
FIG. 22c is a side view of the stroller of FIG. 22a with the seat in a third (full) recline position.
Figure 22D:
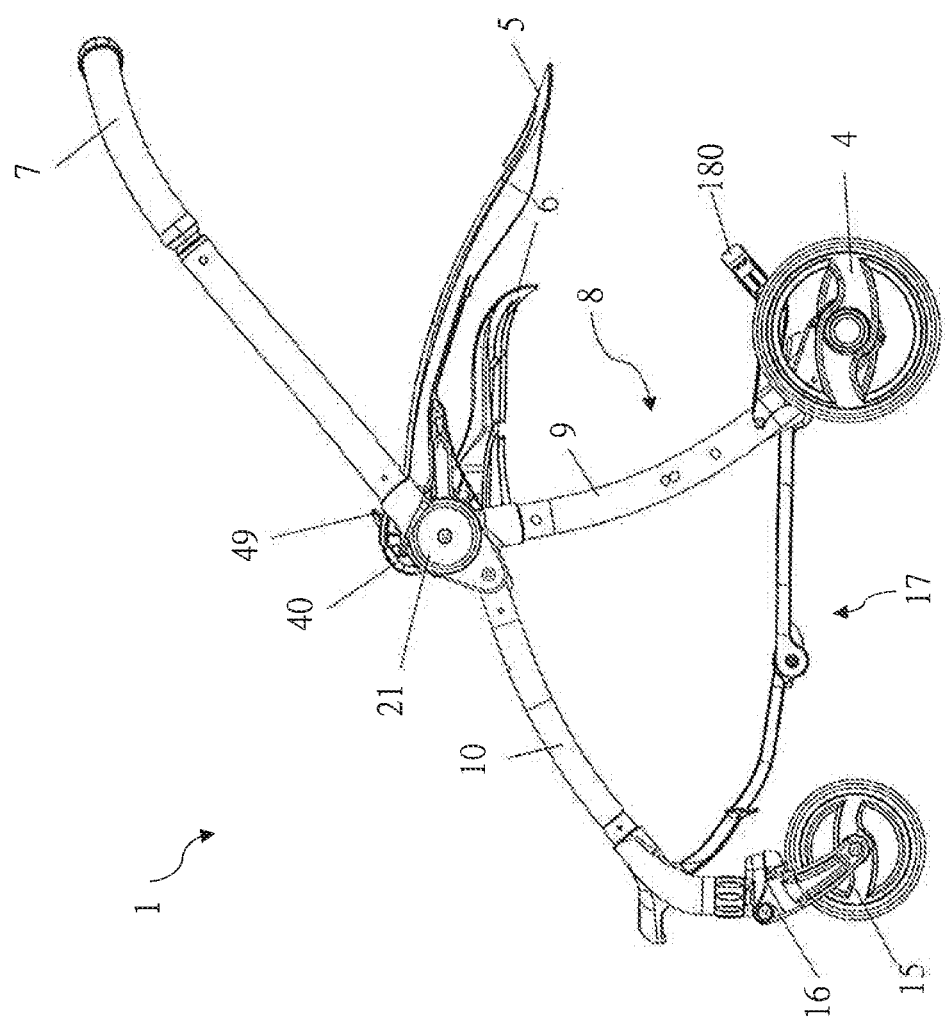
FIG. 22d is a side view of the stroller of FIG. 22a with the seat in a folded state.

The first step is to pull on the recline handle 41, which disengages the first locking element 44 from the teeth 46 cut into the seat hub 40 and allows the seat back 5 to be pivoted rearwards towards the seat base, moving the seat towards the folded state. This movement of the seat back 5 causes the point of the wedge shaped attached seat back protrusion 55 to approach the rear facing stop 38. Further rotation of the seat back 5 towards the seat base 6 puts the seat into the folded state, as shown in FIG. 22d, which causes the angled surface 56 on the seat back protrusion 55 to urge the rear facing stop 38 away from the seat hub 40 and clears a path for the seat base protrusion 54 to proceed beyond the rear facing stop 38. This allows the seat base 6 to pivot downwards allowing the seat to move into the stowed position (see FIG. 17).

Figure 22E:
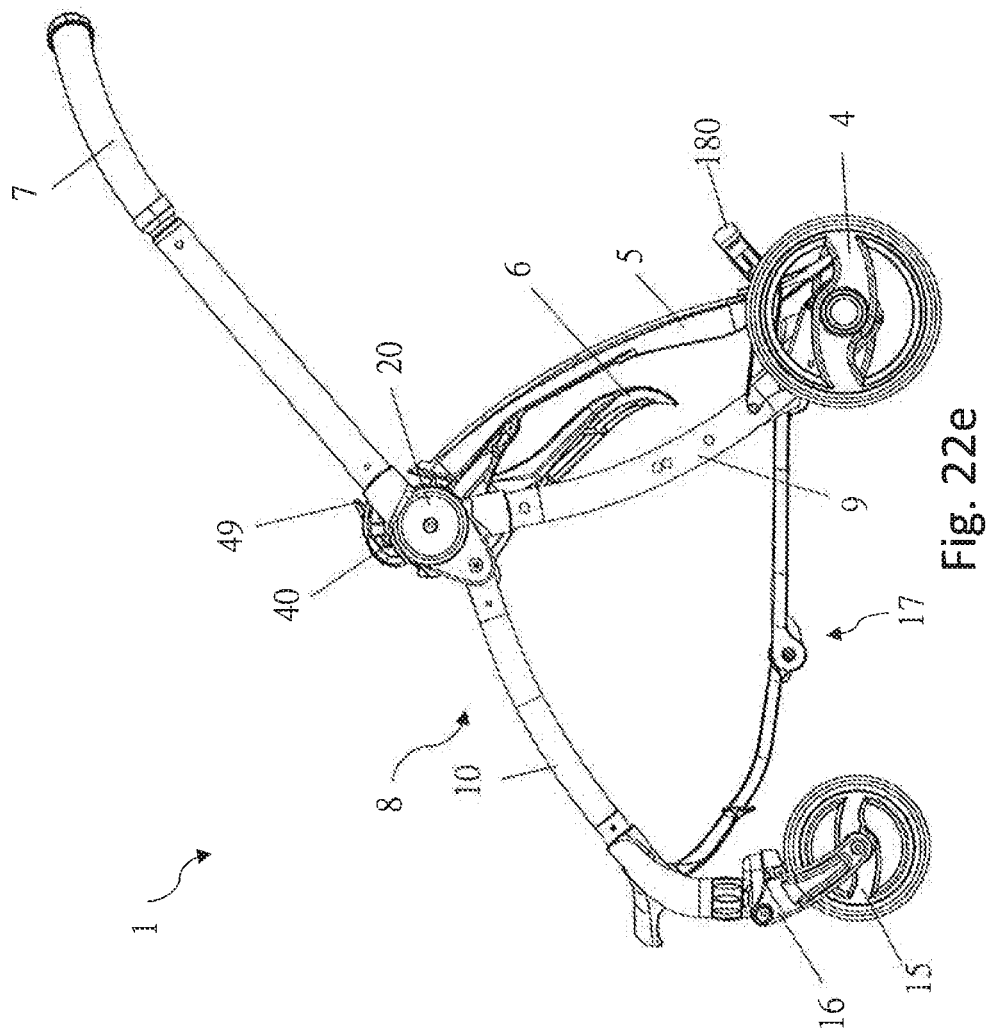
FIG. 22e is a side view of the stroller of FIG. 22a with the seat in a stowed position.

The second step is thus to rotate the seat back 5 and the seat base 6 together to their stowed position as shown in FIG. 22e.

Figure 22F:
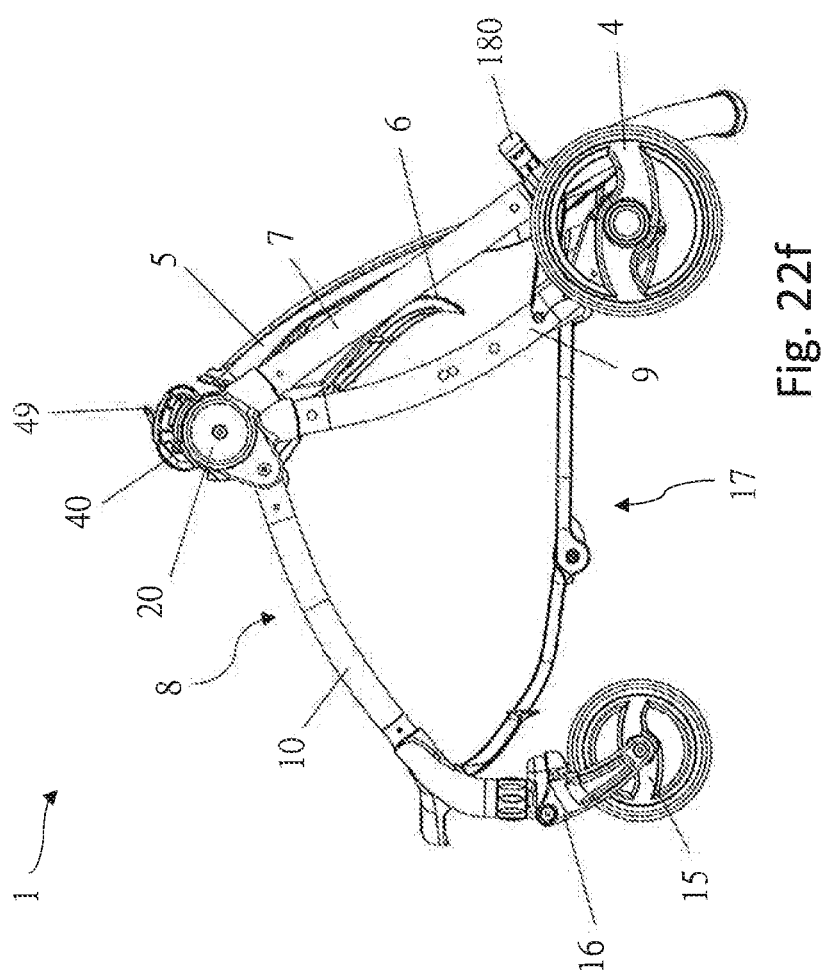
FIG. 22f is a side view of the stroller of FIG. 22a with the handle in a folded state.

The third step is to fold the handle 7 towards the rear legs 9 to its folded state as shown in FIG. 22f. This is now possible because the seat back 5 and the seat base 6 are parallel to one another and in the stowed position, which aligns the arcuate aperture 60 with the arcuate opening 28a and allows the arcuate protrusion 28 to be pushed through the curved opening 28a by rotating the twist grip portion 19. As described above, this unlocks the handle 7 and allows it to be rotated to its stowed state, in which it can be locked by engagement with the latch 180.

The fourth step is to unlock and fold the lower basket 17 in order to move the front wheels 15 towards the rear wheels to move the frame 3 and thus the stroller 1 into its fully collapsed state as shown in FIG. 22g. The lock 62 is again used to secure the stroller 1 in the fully collapsed state.

In order to unfold the stroller 1 from its fully collapsed state to its fully deployed state with the seat facing rearwards the procedure described above is reversed. In particular, the lock 62 is unlocked, the handle 7 is released from the latch 180 and lifted to its deployed state, and the seat back 5 and the seat base 6 are raised and then separated from one another into their deployed states, which engages the rear facing stop 38.

With this arrangement, it is not possible to move the stroller into its fully collapsed state without first moving the seat into its folded state. Accordingly, safety is improved because it is significantly less likely that a child will be trapped in the stroller as it is moved to its fully collapsed state.

Referring to FIGS. 23a-23c, a further embodiment of the invention is shown wherein a seat for a stroller comprises an adjustable harness mount 101. The adjustable harness mount 101 comprises a right portion and a left portion. Each portion comprises a mount 109 that protrudes through to the front of the seat back and is engageable with a harness for safely securing a child to the seat. The mount 109 is formed on a sliding member 108, which is attached to a finger hole 107 connected to a locking element 103 that is arranged to engage with one of a plurality of grooves 102 in order to secure the mount 109 in its position relative to the seat. The adjustable harness mount 101 further comprises a biasing means in the form of a spring 104 that biases the locking element 103 towards the grooves 102 to hold it in position. The sliding member 108 slides up and down the back of the seat and is constrained by first and second guide portions 105, 106.

In use, the height of the mount 109 may be adjusted by pinching the finger hole 107 of each portion together. This movement acts against the biasing force provided by the spring 104 and disengages the locking element 103 from its current groove 102, which allows the sliding member 108 to be slidably moved up and down the seat back whilst held laterally between the first and second guide portions 105, 106. The user then selects a new groove 102 that corresponds with a desired mount 109 height and releases the finger holes 107 of each portion so that the spring 104 biases the locking element 103 into engagement with the groove. This secures the mount 109 at the desired height. A harness can then be attached to the mount 109.

In addition, FIGS. 23a-23c also show a further embodiment of the invention, in which a seat back rear panel 200 is releasably mountable to the back of the seat by using a plurality of magnets 201, which are distributed around and slightly recessed into the perimeter of the seat back. The seat back rear panel 200 also comprises a plurality of magnets correspondingly distributed around its perimeter and slightly protruding so as to be seated within the recesses on the back of the seat. This allows for the seat back rear panel to be interchangeable with other seat back rear panels in order to alter the aesthetic appearance of the seat back. The seat back panel 200 could be mounted to the seat by a variety of other types of releasable fastener. The outside of the seat back panel 200 could be decorated. The seat back panel 200 could have a small cutout along its perimeter to facilitate removal of the seat back panel 200 from the back of the seat when desired.

Figure 24:
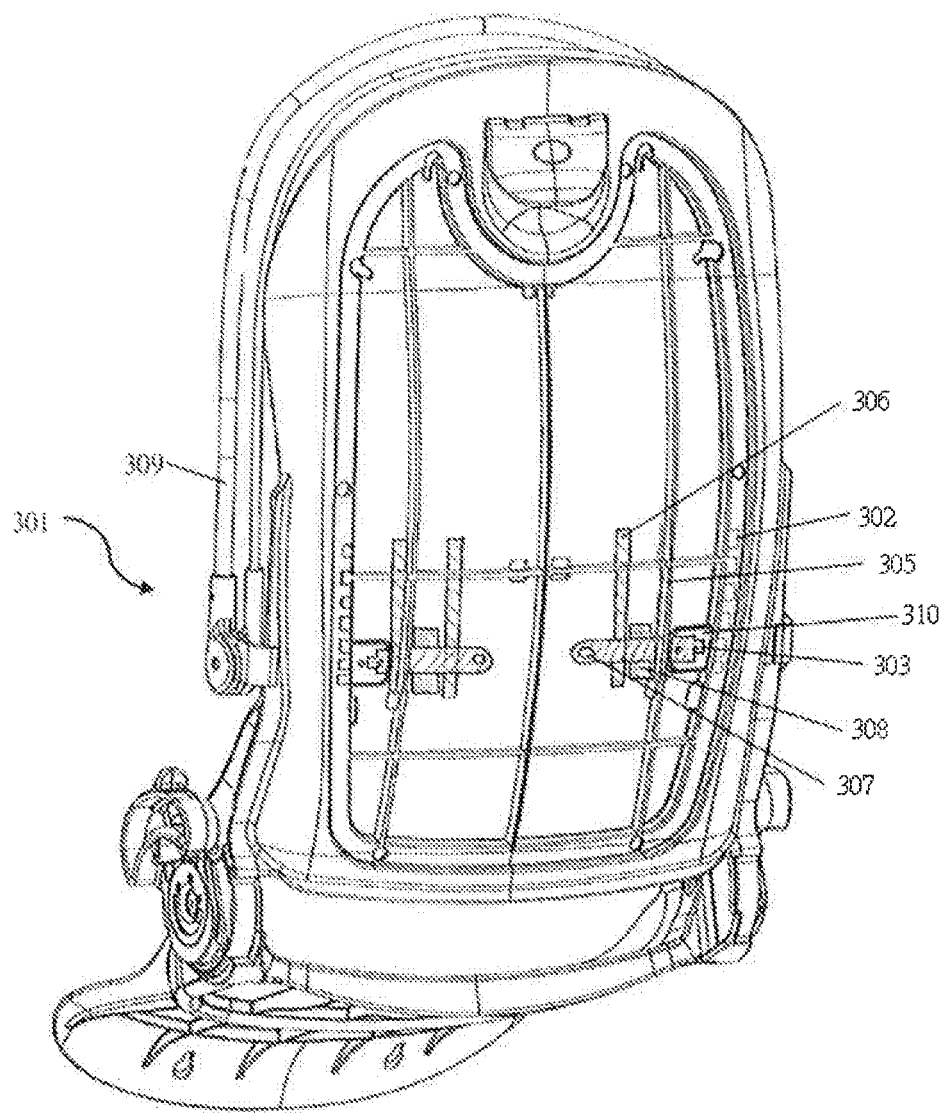
FIG. 24 is a rear perspective view of the seat of FIG. 1 with a rear cover removed and showing detail of an adjustment mechanism for the vertical position of the canopy on the seat back (with the other components of the stroller removed for clarity)
Figure 25:
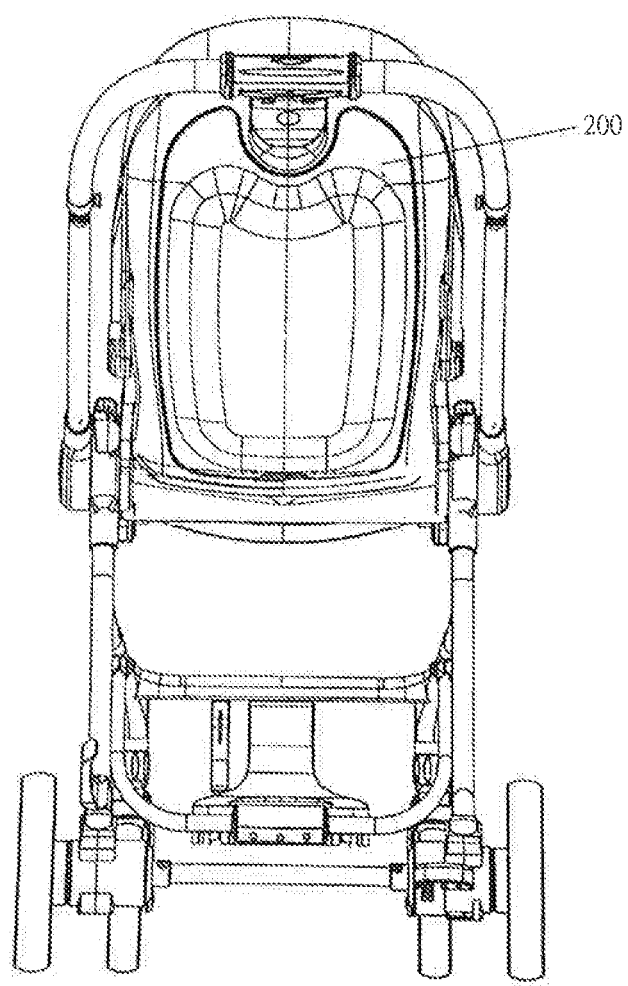
FIG. 25 is a rear perspective view of a stroller including seat back panel.

Referring to FIG. 24, a further embodiment of the invention is shown wherein a seat for a stroller comprises an adjustable canopy mount 301. The adjustable canopy mount 101 comprises a right portion and a left portion. Each portion comprises a mount 310 that is engageable with a U-shaped frame 309 for supporting a canopy. The parts of the adjustable canopy mount 301 and the function the parts is the same as is described above with reference to the adjustable harness mount 101.

The above embodiments are described by way of example only. Many variations are possible without departing from the scope of the invention as defined in the appended claims.

The invention claimed is:

1. A stroller moveable between a fully deployed state and a fully collapsed state, the stroller comprising:
   a seat comprising a seat back pivotably connected to a seat base; and
   one or more stops arranged to prevent the stroller from moving from its fully deployed state to its fully collapsed state,
   wherein said seat base and seat back are operatively connected through a cam surface to said one or more stops such that pivoting of at least one of the seat base and seat back towards the other causes the cam surface to release the one or more stops are and thereby permit folding of the stroller from its fully deployed state to its fully collapsed state.

2. A stroller according to claim 1, wherein the seat is releasably mountable to a frame comprising one or more front legs connected to one or more rear legs.

3. A stroller according to claim 2, wherein the one or more front legs and/or the one or more rear legs are moveable between a deployed state, in which the one or more front legs are spaced apart from the one or more rear legs, and a folded state, in which the one or more front legs are adjacent the one or more rear legs.

4. A stroller according to claim 1, wherein the stroller is arranged so that the seat is mountable to the stroller in a forward facing orientation or a rear facing orientation.

5. A stroller according to claim 1, wherein the seat is moveable between a deployed state, in which it can be sat on by a child, a folded state, in which the seat back and the seat base are adjacent and/or substantially parallel to one another, and a stowed position.

6. A stroller according to claim 5, wherein the stroller further comprises one or more handle adjustment mechanisms for enabling a handle to move between its deployed state and its folded state so that the stroller can move between its fully deployed state and its fully collapsed state.

7. A stroller according to claim 6, wherein the or each handle adjustment mechanism is arranged so that the handle may only be moved between its deployed state and its folded state when the seat is in a stowed position.

8. A stroller according to claim 7, wherein a user operable control of each handle adjustment mechanism is arranged to urge a locking element out of locking engagement with other features of the handle adjustment mechanism when operated by a user to permit or prevent movement of the handle between its deployed and folded states.

9. A stroller according to claim 8, wherein the handle adjustment mechanism is arranged so that a protrusion of the locking element extends into or engage with an opening or aperture in another part of the stroller to permit the handle to move between its deployed state and its folded state.

10. A stroller according to claim 4, further comprising one or more seat mounting mechanisms for releasably attaching the seat to the stroller via a corresponding mechanism on the seat.

11. A stroller according to claim 10 wherein each seat mounting mechanism comprises an opening for receiving a protrusion on the locking element of the or each handle adjustment mechanism.

12. A stroller according to claim 10, wherein each seat mounting mechanism comprises a forward facing stop arranged to prevent rotation of the seat base downwards when the seat is in a forward facing orientation and in its deployed state wherein the forward facing stop is fixed in position.

13. A stroller according to claim 10, wherein each seat mounting mechanism comprises a rear facing stop arranged to prevent rotation of the seat base downwards when the seat is in a rear facing orientation and in its deployed state wherein the rear facing stop is moveable between operative and inoperative positions and is slidably mounted to the forward facing stop and/or seat mounting mechanism.

14. A stroller according to claim 1, wherein the seat comprises one or more seat hubs for pivotably connecting the seat back and the seat base together wherein each seat hub comprises a plate disposed at its centre arranged to permit or prevent movement of the protrusion on the locking element and thus operation of the handle adjustment mechanism depending on the relative orientations of the seat hub and the handle adjustment mechanism.

15. A stroller according to claim 1, wherein the seat base further comprises a seat base protrusion arranged to rotate about the seat hub as the seat base is moved and wherein the seat back further comprises a seat back protrusion arranged to rotate about the seat hub as the seat back is moved wherein the seat back protrusion comprises an angled surface engageable with the rear facing stop as the seat is moved from its deployed state to its folded state.

16. A stroller according to claim 15, wherein engagement between the seat back protrusion and the rear facing stop moves the rear facing stop from an engaged position to a disengaged position which permits the seat base protrusion to proceed beyond the rear facing stop and therefore allows the seat base to be rotated into the stowed position.

17. A stroller according to claim 1, wherein each seat hub comprises a reclining mechanism that allows the seat back to recline relative to the stroller and/or the seat base wherein the reclining mechanism comprises a releasable locking member having a first locking element engageable with one or more teeth formed in the seat hub and a user operable control provided to enable the locking member to be released to a first release position.

18. A stroller according to claim 17, wherein the seat base further comprises a cam profile for engaging with a second locking element of the seat hub wherein said cam profile is arranged to rotate about the seat hub as the seat base is moved and to contact with and raise the second locking element as the seat base is lifted, such that the coupled first locking element is moved to a second release position, beyond the first release position.

19. A stroller, comprising:
   a seat moveable between a deployed state and a folded state, the seat comprising a seat back pivotably connected to a seat base;
   a handle moveable between a deployed state and a folded state;
   one or more stops arranged to prevent movement from the deployed state to folded state, and
   a handle adjustment mechanism, wherein the handle adjustment mechanism is arranged to permit the handle to move between its deployed state and its folded state only when the seat is in a predetermined state;
   wherein said seat base and seat back are operatively connected through a cam surface to said one or more stops such that pivoting of at least one of the seat base and seat back towards the other causes the cam surface to release the one or more stops and thereby permit the movement from the deployed state to the collapsed state.

20. A stroller according to claim 19, wherein the predetermined state is when the seat is in its folded state or wherein the predetermined state is when the seat is in a stowed position.

21. A stroller moveable between a fully deployed state and a fully collapsed state, the stroller comprising:
 a seat comprising a seat back pivotably connected to a seat base; and
 one or more stops arranged to prevent the stroller from moving from its fully deployed state to its fully collapsed state;
 wherein the one or more stops are arranged to be released to permit the stroller to move from its fully deployed state to its fully collapsed state when at least one of the seat base and seat back is pivoted towards the other; and
 wherein the seat is releasably mountable to a frame comprising one or more front legs connected to one or more rear legs.

22. A stroller moveable between a fully deployed state and a fully collapsed state, the stroller comprising:
 a seat comprising a seat back pivotably connected to a seat base; and
 one or more stops arranged to prevent the stroller from moving from its fully deployed state to its fully collapsed state;
 wherein the one or more stops are arranged to be released to permit the stroller to move from its fully deployed state to its fully collapsed state when at least one of the seat base and seat back is pivoted towards the other; and
 wherein the stroller is arranged so that the seat is mountable to the stroller in a forward facing orientation or a rear facing orientation.

* * * * *